(12) United States Patent
Kuo et al.

(10) Patent No.: US 9,487,619 B2
(45) Date of Patent: Nov. 8, 2016

(54) CARBOXYL FUNCTIONAL CURABLE POLYESTERS CONTAINING TETRA-ALKYL CYCLOBUTANEDIOL

(71) Applicant: Eastman Chemical Company, Kingsport, TN (US)

(72) Inventors: Thauming Kuo, Kingsport, TN (US); Junjia Liu, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/524,509

(22) Filed: Oct. 27, 2014

(65) Prior Publication Data

US 2016/0115274 A1 Apr. 28, 2016

(51) Int. Cl.
| | | |
|---|---|---|
| *C08G 64/00* | (2006.01) | |
| *C08G 63/199* | (2006.01) | |
| *C08G 63/78* | (2006.01) | |
| *C09D 167/02* | (2006.01) | |
| *C08G 63/02* | (2006.01) | |
| *C08K 5/17* | (2006.01) | |

(52) U.S. Cl.
CPC .............. *C08G 63/199* (2013.01); *C08G 63/78* (2013.01); *C09D 167/02* (2013.01); *C08K 5/17* (2013.01)

(58) Field of Classification Search
CPC ........................................................ C08G 63/78
USPC .................................................. 528/271, 272
See application file for complete search history.

(56) References Cited

U.S. PATENT DOCUMENTS

| | | | |
|---|---|---|---|
| 3,018,272 | A | 1/1962 | Griffing et al. |
| 3,033,822 | A | 5/1962 | Kibler et al. |
| 3,075,952 | A | 1/1963 | Coover, Jr. et al. |
| 3,108,083 | A | 10/1963 | Laganis |
| 3,216,884 | A | 11/1965 | O'Donnell |
| 3,227,764 | A | 1/1966 | Martin et al. |
| 3,312,645 | A | 4/1967 | George et al. |
| 3,313,777 | A | 4/1967 | Elam et al. |
| 3,345,313 | A | 10/1967 | Ruhf et al. |
| 3,484,339 | A | 12/1969 | Caldwell |
| 3,502,620 | A | 3/1970 | Caldwell |
| 3,528,947 | A | 9/1970 | Lappin et al. |
| 3,538,187 | A * | 11/1970 | Feltzin .................. C08G 63/676 525/27 |
| 3,734,874 | A | 5/1973 | Kibler et al. |
| 3,772,227 | A | 11/1973 | Kapalko et al. |
| 3,779,993 | A | 12/1973 | Kibler et al. |
| 3,789,044 | A | 1/1974 | Taft et al. |
| 3,800,004 | A | 3/1974 | Sherwood et al. |
| 3,856,830 | A | 12/1974 | Kuehn |
| 4,054,681 | A | 10/1977 | Brüning et al. |
| 4,074,061 | A | 2/1978 | Musser |
| 4,076,766 | A | 2/1978 | Simms |
| 4,119,680 | A | 10/1978 | Vachon |
| 4,120,847 | A | 10/1978 | Culbertson |
| 4,196,109 | A | 4/1980 | Laganis et al. |
| 4,264,671 | A | 4/1981 | Gillern et al. |
| 4,267,279 | A | 5/1981 | Howell |
| 4,299,933 | A | 11/1981 | McConnell et al. |
| 4,304,901 | A | 12/1981 | O'Neill et al. |
| 4,322,508 | A | 3/1982 | Peng et al. |
| 4,338,379 | A | 7/1982 | Strolle et al. |
| 4,350,807 | A | 9/1982 | McConnell et al. |
| 4,363,908 | A | 12/1982 | Joyner et al. |
| 4,397,989 | A | 8/1983 | Adesko |
| 4,433,119 | A | 2/1984 | Brode et al. |
| 4,480,077 | A | 10/1984 | Hefner, Jr. |
| 4,525,504 | A | 6/1985 | Morris et al. |
| 4,525,544 | A | 6/1985 | Nelson et al. |
| 4,581,093 | A | 4/1986 | Noyes et al. |
| 4,585,854 | A | 4/1986 | Tung et al. |
| 4,698,391 | A | 10/1987 | Yacobucci et al. |

(Continued)

FOREIGN PATENT DOCUMENTS

| | | |
|---|---|---|
| BE | 615850 | 7/1962 |
| CA | 2 111 927 A1 | 6/1994 |

(Continued)

OTHER PUBLICATIONS

ASTM D4752-10; Standard Practice for Measuring MEK Resistance of Ethyl Silicate (Inorganic) Zinc-Rich Primers by Solvent Rub.

(Continued)

*Primary Examiner* — Terressa Boykin
(74) *Attorney, Agent, or Firm* — Matthew W. Smith

(57) ABSTRACT

A curable polyester resin composition containing residues of:
  a) polyhydroxyl compounds that include:
    (i) 2,2,4,4-tetraalkylcyclobutane-1,3-diol (TACD) compounds, and
    (ii) polyhydroxyl compounds other than TACD, and
  b) polycarboxylic acid compounds that include:
    (i) polycarboxylic acid compounds, a derivative of polycarboxylic acid compound other than (bii), or a combination thereof, and
    (ii) a polycarboxylic anhydride compound;
wherein the curable polyester resin has an acid number ranging from about 20 to about 120 mg KOH/g, a hydroxyl number ranging from greater than 0 to about 100 mg KOH/g, and an acid number:hydroxyl (AN:OH) number ratio of at least 0.5:1. The curable polyester resin can be dispersed in water or a solvent and is suitable for waterborne or solventborne coating compositions and powder coating applications. Phenolic based crosslinking coating compositions that contain these curable polyester resins are curable at elevated temperatures.

52 Claims, No Drawings

(56) References Cited

U.S. PATENT DOCUMENTS

| | | |
|---|---|---|
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,771,101 A | 9/1988 | Pruett et al. |
| 4,859,760 A | 8/1989 | Light, Jr. et al. |
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |
| 5,023,367 A | 6/1991 | Calbo, Jr. et al. |
| 5,025,086 A | 6/1991 | Blount, Jr. et al. |
| 5,097,006 A | 3/1992 | Kapilow et al. |
| 5,124,388 A | 6/1992 | Pruett et al. |
| 5,160,792 A | 11/1992 | Barbee et al. |
| 5,218,042 A | 6/1993 | Kuo et al. |
| 5,245,002 A | 9/1993 | Kuo |
| 5,254,637 A | 10/1993 | Witzeman et al. |
| 5,256,759 A | 10/1993 | Kuo |
| 5,256,761 A | 10/1993 | Blount, Jr. |
| 5,288,820 A | 2/1994 | Rector, Jr. et al. |
| 5,290,631 A | 3/1994 | Fleury et al. |
| 5,306,567 A | 4/1994 | Kuo et al. |
| 5,321,118 A | 6/1994 | Hubbs et al. |
| 5,326,820 A | 7/1994 | Hoffmann et al. |
| 5,344,872 A | 9/1994 | Debord et al. |
| 5,349,026 A | 9/1994 | Emmons et al. |
| 5,369,210 A | 11/1994 | George et al. |
| 5,371,148 A | 12/1994 | Taylor et al. |
| 5,393,609 A | 2/1995 | Chang et al. |
| 5,393,840 A | 2/1995 | Kuo |
| 5,393,849 A | 2/1995 | Srinivasan et al. |
| 5,397,641 A | 3/1995 | Moens et al. |
| 5,416,187 A | 5/1995 | Kuo et al. |
| 5,439,988 A | 8/1995 | Moens et al. |
| 5,464,909 A | 11/1995 | Chang et al. |
| 5,498,668 A | 3/1996 | Scott |
| 5,541,268 A | 7/1996 | Fenn et al. |
| 5,554,701 A | 9/1996 | Chang et al. |
| 5,596,037 A | 1/1997 | Moens et al. |
| 5,646,237 A | 7/1997 | George et al. |
| 5,654,347 A | 8/1997 | Khemani et al. |
| 5,696,176 A | 12/1997 | Khemani et al. |
| 5,852,120 A | 12/1998 | Bederke |
| 5,919,873 A | 7/1999 | Irving |
| 5,955,565 A | 9/1999 | Morris et al. |
| 5,993,975 A | 11/1999 | Tanaka et al. |
| 6,087,464 A | 7/2000 | Swarup et al. |
| 6,120,851 A | 9/2000 | Borgholte et al. |
| 6,184,311 B1 | 2/2001 | O'Keeffe et al. |
| 6,211,309 B1 | 4/2001 | McIntosh et al. |
| 6,248,843 B1 | 6/2001 | Panandiker et al. |
| 6,255,366 B1 | 7/2001 | Adams et al. |
| 6,265,072 B1 | 7/2001 | Fagerburg |
| 6,423,816 B1 | 7/2002 | Wamprecht et al. |
| 6,444,781 B1 | 9/2002 | Kuo et al. |
| 6,780,523 B2 | 8/2004 | Kuo et al. |
| 6,887,937 B1 | 5/2005 | Vandevoorde et al. |
| 6,992,133 B2 | 1/2006 | Yokoyama et al. |
| 6,995,194 B2 | 2/2006 | Moens et al. |
| 7,087,672 B2 | 8/2006 | Yuan et al. |
| 7,141,625 B2 | 11/2006 | Komazaki et al. |
| 8,163,850 B2 | 4/2012 | Marsh et al. |
| 8,168,721 B2 | 5/2012 | Marsh et al. |
| 8,324,316 B2 | 12/2012 | Powell et al. |
| 8,449,960 B2 | 5/2013 | Skillman et al. |
| 8,519,055 B2 | 8/2013 | Marsh et al. |
| 8,524,834 B2 | 9/2013 | Marsh et al. |
| 8,580,872 B2 | 11/2013 | Kuo et al. |
| 8,663,765 B2 | 3/2014 | Skillman et al. |
| 9,029,460 B2 | 5/2015 | Marsh et al. |
| 9,029,461 B2 | 5/2015 | Marsh et al. |
| 9,096,772 B2 | 8/2015 | Lespinasse et al. |
| 2001/0051706 A1 | 12/2001 | George et al. |
| 2002/0086154 A1 | 7/2002 | Miller et al. |
| 2002/0103329 A1 | 8/2002 | Koldijk et al. |
| 2003/0083425 A1 | 5/2003 | Morimoto et al. |
| 2003/0113462 A1 | 6/2003 | Hirose et al. |
| 2003/0205852 A1 | 11/2003 | Porter |
| 2004/0024140 A1 | 2/2004 | Fujita et al. |
| 2004/0087736 A1 | 5/2004 | Wu et al. |
| 2005/0176859 A1 | 8/2005 | Tinkl et al. |
| 2006/0079650 A1 | 4/2006 | Stevenson et al. |
| 2006/0286383 A1 | 12/2006 | Gilmer |
| 2007/0020557 A1 | 1/2007 | Yao et al. |
| 2007/0092746 A1 | 4/2007 | Wayton et al. |
| 2007/0232778 A1 | 10/2007 | Moody et al. |
| 2007/0276065 A1 | 11/2007 | Barton et al. |
| 2008/0092776 A1 | 4/2008 | Stockl et al. |
| 2008/0135060 A1 | 6/2008 | Kuo et al. |
| 2008/0139687 A1 | 6/2008 | Woods et al. |
| 2009/0047524 A1 | 2/2009 | Yaoi et al. |
| 2009/0110843 A1 | 4/2009 | Halahmi et al. |
| 2010/0204363 A1 | 8/2010 | Marsh et al. |
| 2010/0204388 A1 | 8/2010 | Marsh et al. |
| 2010/0204392 A1 | 8/2010 | Marsh et al. |
| 2010/0204401 A1 | 8/2010 | Marsh et al. |
| 2010/0204413 A1 | 8/2010 | Powell et al. |
| 2010/0297422 A1 | 11/2010 | Lucas |
| 2011/0315591 A1 | 12/2011 | Lespinasse et al. |
| 2012/0101187 A1 | 4/2012 | Kuo et al. |
| 2012/0172520 A1 | 7/2012 | Marsh et al. |
| 2012/0202920 A1 | 8/2012 | Marsh et al. |
| 2013/0023604 A1 | 1/2013 | Kuo et al. |
| 2013/0296470 A1 | 11/2013 | Marsh et al. |
| 2013/0296488 A1 | 11/2013 | Marsh et al. |
| 2013/0324640 A1 | 12/2013 | Parish |
| 2014/0018496 A1 | 1/2014 | Kuo et al. |
| 2014/0296406 A1 | 10/2014 | Marsh et al. |
| 2014/0296407 A1 | 10/2014 | Marsh et al. |
| 2014/0303283 A1 | 10/2014 | Ding et al. |
| 2015/0034522 A1 | 2/2015 | Itou et al. |
| 2015/0099827 A1 | 4/2015 | Hagiwara et al. |
| 2015/0099837 A1 | 4/2015 | Argyropoulos et al. |
| 2016/0115345 A1 | 4/2016 | Kuo et al. |
| 2016/0115347 A1 | 4/2016 | Kuo et al. |
| 2016/0115348 A1 | 4/2016 | Kuo et al. |

FOREIGN PATENT DOCUMENTS

| | | |
|---|---|---|
| EP | 1 273 626 A1 | 1/2003 |
| EP | 1 647 564 | 4/2006 |
| GB | 1 044 015 | 9/1966 |
| GB | 1 115 189 A | 5/1968 |
| GB | 1 130 558 | 10/1968 |
| GB | 2 025 998 B | 10/1982 |
| JP | 03-038281 | 2/1991 |
| JP | 08-073781 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | 94/01506 | 1/1994 |
| WO | 94/12557 | 6/1994 |
| WO | 95/01407 | 1/1995 |
| WO | 96/33229 | 10/1996 |
| WO | 01/48097 A1 | 7/2001 |
| WO | 2006/083343 | 8/2006 |
| WO | 2006/138198 | 12/2006 |
| WO | 2007/001567 | 1/2007 |
| WO | 2007/001571 A1 | 1/2007 |
| WO | 2007/078851 | 7/2007 |
| WO | 2013/098218 A1 | 7/2013 |
| WO | 2014/203857 A1 | 12/2014 |
| WO | 2015/156094 A1 | 10/2015 |

OTHER PUBLICATIONS

ASTM D4274-11; Standard Test Methods for Testing Polyurethane Raw Materials: Determination of Hydroxyl Numbers of Polyols.

Witzeman et al.; "Comparison of Methods for the Preparation of Acetoacetylated Coating Resins"; Journal of Coatings Technology; vol. 62; No. 789; Oct. 1990; pp. 101-112.

(56) References Cited

OTHER PUBLICATIONS

Narayan et al.; "Properties of acetoacetylated hydroxylated polyesters based polyurethane coatings"; Progress in Organic Coatings; 45; (2002); pp. 59-67.
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$ 295-307.
Husbands, M.J., et al., "Polyester Resubgs", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), $19^{th}$ ed. pp. 182-195.
"Coating Processes (Powder Technology)"; Kirk-Othmer Encyclopedia of Chemical Technology, 4th Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al., "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resings", Organic Coatings Science and Technology $2^{nd}$ ed., 13, (1999), p. 246-257.
Co-pending U.S. Appl. No. 14/026,424, filed Sep. 13, 2013, Kuo et al.
Non-Final Office Action dated Nov. 16, 2015 received in co-pending U.S. Appl. No. 14/026,424.
Final Office Action dated Mar. 3, 2016 received in co-pending U.S. Appl. No. 14/026,424.
Co-pending U.S. Appl. No. 14/524,514, filed Oct. 27, 2014, Kuo et al.

Non-Final Office Action dated May 6, 2016 received in co-pending U.S. Appl. No. 14/524,514.
Co-pending U.S. Appl. No. 14/540,490, filed Nov. 13, 2014, Kuo et al.
Non-Final Office Action dated May 12, 2016 received in co-pending U.S. Appl. No. 14/540,490.
Co-pending U.S. Appl. No. 14/683,278, filed Apr. 10, 2015, Kuo et al.
Non-Final Office Action dated May 4, 2016 received in co-pending U.S. Appl. No. 14/683,278.
Co-pending U.S. Appl. No. 14/865,112, filed Sep. 25, 2015, Inglefield et al.
Co-pending U.S. Appl. No. 14/922,846, filed Oct. 26, 2016, Kuo et al.
Co-pending U.S. Appl. No. 15/078,537, filed Mar. 23, 2016, Zhou et al.
International Search Report and Written Opinion for PCT/US2015/057529 dated Jan. 27, 2016.
International Search Report and Written Opinion for PCT/US2012/045357 dated Sep. 24, 2012.
ASTM D1639-90; Standard Test Method for Acid Value of Organic Coating Materials.
Biedermann et al.; "Phenolic resins for can coatings: II. Resoles based on cresol/phenol mixtures of tert. butyl phenol"; LWT—Food Science and Technology; 39; (2006); pp. 647-659 (Elsevier).
Zhang, Musan et al.; "Tailoring adhesive performance of sulfonated segmented block copolymers"; Database CA [Online]; Chemical Abstracts Service; XP002682877.
International Search Report and Written Opinion for PCT/US2015/057524 dated Jun. 17, 2016.
Oldring, P.K.T. et al.; Resins for Surface Coatings; vol. III; pp. 63-167; SITA Technology; London, UK; 1987.
Co-pending U.S. Appl. No. 15/172,288, filed Jun. 3, 2016, Kuo et al.
Co-pending U.S. Appl. No. 14/716,027, filed May 19, 2015, Zhou et al.
ASTM D522; Standard Test Methods for Mandrel Bend Test of Attached Organic Coatings.
ASTM D2794; Standard Test Method for Resistance of Organic Coatings to the Effect of Rapid Deformation (Impact).
ASTM D3359—$09^{e2.}$; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D6279; Standard Test Method for Rub Abrasion Mar Resistance of High Gloss Coatings.
The Chemisty of Polyurethane Coatings, Technical Publication, p. 20, by Bayer Material Science, 2005.
International Search Report and Written Opinion for PCT/US2016/32646 dated Aug. 16, 2016.

* cited by examiner

CARBOXYL FUNCTIONAL CURABLE POLYESTERS CONTAINING TETRA-ALKYL CYCLOBUTANEDIOL

FIELD OF THE INVENTION

This invention pertains to curable polyesters for water and solvent borne, thermosetting coating compositions and powder coatings. More specifically, this invention pertains to carboxyl-functional curable polyesters containing 2,2,4,4-tetramethyl-1,3-cyclobutanediol and thermosetting coating compositions prepared from these polyesters.

BACKGROUND OF THE INVENTION 2,2,4,4-Tetraalkyl-1,3-cyclobutanediol (TACD) is a cycloaliphatic compound that can be used as a diol component for making polyesters. Thermoplastics based on TACD polyester exhibit improved impact resistance owing to TACD's unique structure. TACD can also provide improved hydrolytic stability of the polyester due to its secondary hydroxyl functionality. Both of these properties are highly desirable in thermosetting coatings.

However, coatings made with TACD containing curable polyester resins where the primary mode of cross-linking is across the hydroxyl groups on the curable polyester resin are slow to cure because the secondary hydroxyl groups on the TACD moiety are slow to react under curing conditions. To the extent that a cross-linked matrix does form, it is only poorly cross-linked which manifests itself in the formation of films with poor solvent resistance. Thus, there is a need to provide TACD based curable polyester resins that are able to more rapidly cure with conventional crosslinkers, especially phenolic based cross-linkers, and provide a well cross-linked coating that has good properties.

SUMMARY OF THE INVENTION

This invention provides a curable TACD polyester that has both carboxyl and hydroxyl functionalities and a high ratio of carboxyl functionalities to hydroxyl functionalities. The level of carboxyl functionality is sufficient to provide water dispersibility after neutralization when water borne coatings are desired. Moreover, the carboxyl functionality provides a curable polyester resin that suitable for cross-linking with both hydroxyl-curable cross-linking compounds and acid-curable cross-linking compounds. The dual functionalities on the curable polyester resin offer a variety of crosslinking mechanisms for curing.

In particular, there is now provided a composition comprising a curable polyester resin, said curable polyester resin comprising the residues of
a) polyhydroxyl compounds comprising:
  i) 2,2,4,4-tetraalkylcyclobutane-1,3-diol (TACD) compounds, and
  ii) polyhydroxyl compounds other than TACD, and
b) polycarboxyl compounds comprising:
  i) a polycarboxylic acid compound, a derivative of polycarboxylic acid compound (other than (bii)), or a combination thereof, and
  ii) a polycarboxylic anhydride compound;
wherein said curable polyester resin has an acid number ranging from about 20 to about 120 mg KOH/g, a hydroxyl number ranging from greater than 0 to about 100 mg KOH/g, and an acid number:hydroxyl (AN:OH) number ratio of at least 0.5:1.

There is also provided a curable polyester resin comprising the residues of:
a) polyhydroxyl compounds comprising:
  i) 2,2,4,4-tetraalkylcyclobutane-1,3-diol (TACD) compounds in an amount ranging from about 3 to 98 mole %, based on the total moles of polyhydroxyl compounds (a), and
  ii) polyhydroxyl compounds other than TACD comprising
    (1) a diol in an amount ranging from 0 to 95 mole %, based on the total moles of (a), and
    (2) a polyhydroxyl compound having 3 or more hydroxyl groups in an amount ranging from 2 to 20 mole %, based on the total moles of (a), and
b) polycarboxyl compounds comprising
  i) a polycarboxylic acid, a derivative of polycarboxylic acid compound (other than bii)), or a combination thereof in an amount ranging from 70 to 95 mole %, based on the total moles of (b), and
  ii) a polycarboxylic anhydride in an amount ranging from 5 to 30 mole %, based on the total moles of (b),
wherein said polyester has an acid number ranging from about 30 to about 100 mg KOH/g and a hydroxyl number ranging from 3 to about 80 mg KOH/g.

If desired, this polyester can have an acid number:hydroxyl number ratio of at least 0.5:1.

There is also provided a method for making a curable polyester resin composition comprising:
a) in a first stage, combining the polyhydroxyl compounds and polycarboxylic acid compounds to form a reaction mixture, and reacting the reaction mixture in a reactor at a temperature from 180-250° C., optionally in the presence of an acid catalyst until the reaction mixture has an acid number of 0 to 20 mg KOH/g, and
b) thereafter, a second stage for forming a curable polyester composition by reacting a polycarboxylic anhydride with the reaction mixture at a temperature of 140° C. to 180° C. to thereby obtain a polyester composition having an acid number of greater than 20 mg KOH/g.

The curable polyester resins may be used in water borne coatings, solvent borne coatings, powder coating. Such coatings can be used in automotive OEM, auto refinish, transportation, aerospace, maintenance, marine, machinery and equipment, general metal, appliance, metal furniture, commercial construction, home construction, architectural coating applications, paints, packaging such as metal can coatings, and coil.

DETAILED DESCRIPTION OF THE INVENTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not only the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ alkyl groups" is intended to specifically include and disclose $C_1$ and $C_5$ alkyl groups as well as $C_2$, $C_3$, and $C_4$ alkyl groups.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "polycarboxylic acid", a "residue" is synonymous with "at least one" or "one or more" polyesters, polycarboxylic acids, or residues and is thus intended to refer to both a single or plurality of polyesters, polycarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable polyester", as used herein, is synonymous with the term "resin" and is intended to mean a polymer prepared by the polycondensation of one or more polycarboxylic acid compounds and one or more polyhydroxyl compounds. The curable polyester of the present invention is useful to make a thermoset polymer and is particularly suitable as a resin for coatings.

The term "residue(s)" means the portion of a molecule in the polyester that remains after its reaction to form the curable polyester resin.

The phrase "at least a portion" includes a portion or the whole.

This invention provides a curable TACD polyester that has both carboxyl and hydroxyl functionalities and a high ratio of carboxyl functionalities to hydroxyl functionalities. The level of carboxyl functionality is sufficient to provide water dispersibility after neutralization when water borne coatings are desired. Moreover, the carboxyl functionality provides a curable polyester resin that suitable for cross-linking with both hydroxyl-curable cross-linking compounds and acid-curable cross-linking compounds. The dual functionalities on the curable polyester resin offer a variety of crosslinking mechanisms for curing.

In particular, there is now provided a composition comprising a curable polyester resin, said curable polyester resin comprising the residues of:

a) polyhydroxyl compounds comprising:
  i) 2,2,4,4-tetraalkylcyclobutane-1,3-diol (TACD) compounds, and
  ii) polyhydroxyl compounds other than TACD, and
b) polycarboxyl compounds comprising:
  i) a polycarboxylic acid compound, a derivative of polycarboxylic acid compound (other than (bii)), or a combination thereof, and
  ii) a polycarboxylic anhydride compound;

wherein said curable polyester resin has an acid number ranging from about 20 to about 120 mg KOH/g, a hydroxyl number ranging from greater than 0 to about 100 mg KOH/g, and an acid number:hydroxyl (AN:OH) number ratio of at least 0.5:1.

The composition contains a curable polyester resin. The curable polyester resin contains residues or moieties of (a) polyhydroxyl compounds. The polyhydroxyl compounds used to obtain the curable polyester resin include at least two types:
  i) 2,2,4,4-tetraalkylcyclobutane-1,3-diol (TACD) compounds, and
  ii) polyhydroxyl compounds other than TACD.

The ai) 2,2,4,4-tetraalkylcyclobutane-1,3-diol compounds can be represented by the general structure:

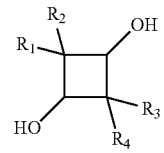

wherein $R_1$, $R_2$, $R_3$, and $R_4$ each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably the TACD compound comprises 2,2,4,4-tetramethylcyclobutane-1,3-diol ("TMCD").

The molar quantity of TACD (ai) used to make the curable polyester of the invention, based on the total moles of the polyhydroxyl compounds (a), is desirably at least 20 mole %, or at least 30 mole %, or at least 40 mole %, or at least 50 mole %, or more than 50 mole %, or at least 55 mole %, or at least 60 mole %, or at least 65 mole %, or at least 70 mole %, or at least 75 mole %, or at least 80 mole %, or at least 85 mole %, or at least 90 mole %, or at least 95 mole %. Additionally, or in the alternative, the molar quantity of TACD (ai) is up to 100 mole %, or less than 100 mole %, or up to 99 mole %, or up to 98 mole %, or up to 97 mole %, or up to 96 mole %, or up to 95 mole %, or up to 93 mole %, or up to 91 mole %, or up to 90 mole %, based on 100% of all the moles of polyhydroxyl compounds (a).

The molar quantity of TACD can exceed the molar quantity of any other polyhydroxyl compound.

The molar quantity of TACD can exceed the molar quantity of all other polyhydroxyl compounds.

Suitable ranges of TACD, in mole % based on 100 mole % of all polyhydroxyl compounds (a), are 20-100, or 30-100, or 40-100, or 50-100, or more than 50-100, or 55-100, or 60-100, or 65-100, or 70-100, or 75-100, or 80-100, or 85-100, or 90-100, or 95-100, or 20-less than 100, or 30-less than 100, or 40-less than 100, or 50-less than 100, or more than 50-less than 100, or 55-less than 100, or 60-less than 100, or 65-less than 100, or 70-less than 100, or 75-less than 100, or 80-less than 100, or 85-less than 100, or 90-less than 100, or 95-less than 100, or 20-99, or 30-99, or 40-99, or 50-99, or more than 50-99, or 55-99, or 60-99, or 65-99, or 70-99, or 75-99, or 80-99, or 85-99, or 90-99, or 95-99, or 20-98, or 30-98, or 40-98, or 50-98, or more than 50-98, or 55-98, or 60-98, or 65-98, or 70-98, or 75-98, or 80-98, or 85-98, or 90-98, or 95-98, or 20-97, or 30-97, or 40-97, or 50-97, or more than 50-97, or 55-97, or 60-97, or 65-97, or 70-97, or 75-97, or 80-97, or 85-97, or 90-97, or 95-97, or 20-96, or 30-96, or 40-96, or 50-96, or more than 50-96, or 55-96, or 60-96, or 65-96, or 70-96, or 75-96, or 80-96, or 85-96, or 90-96, or 95-96, or 20-95, or 30-95, or 40-95, or 50-95, or more than 50-95, or 55-95, or 60-95, or 65-95, or 70-95, or 75-95, or 80-95, or 85-95, or 90-95, or 20-93, or 30-93, or 40-93, or 50-93, or more than 50-93, or 55-93, or 60-93, or 65-93, or 70-93, or 75-93, or 80-93, or 85-93, or 90-93, or 20-91, or 30-91, or 40-91, or 50-91, or more than 50-91, or 55-91, or 60-91, or 65-91, or 70-91, or 75-91, or 80-91, or 85-91, or 90-91, or 20-90, or 30-90, or 40-90, or 50-90, or more than 50-90, or 55-90, or 60-90, or 65-90, or 70-90, or 75-90, or 80-90, or 85-90. In general, suitable ranges of TACD, in moles relative to 100 mole % of all polyhydroxyl compounds (a), include more than 50-100, or 55-100, or 60-100, or 65-100, or 70-100, or 75-100, or 80-100, or 85-100, or 50-less than 100, or more than 50-less than 100, or 55-less than 100, or 60-less than 100, or 65-less than 100, or 70-less than 100, or 75-less than 100, or 80-less than 100, or 85-less than 100, or 50-98, or 55-98, or 60-98, or 65-98, or 70-98, or 75-98, or 80-98, or 85-98, or 50-95, or more than 50-95, or 55-95, or 60-95, or 65-95, or 70-95, or 75-95, or 80-95, or 50-90, or more than 50-90, or 55-90, or 60-90, or 65-90, or 70-90, or 75-90, or 80-90, or 85-90.

The molar quantity of TACD (ai) residues in the curable polyester of the invention, based on the total moles of all components of the curable polyester resin, can be at least 5 mole %, or at least 10 mole %, or at least 15 mole %, or at least 20 mole %, or at least 25 mole %, or at least 27 mole %, or at least 30 mole %, or at least 33 mole %, or at least 35 mole %, or at least 37 mole %, or at least 40 mole %, or at least 43 mole %, or at least 45 mole %, or at least 47 mole %, or at least 50 mole %. Additionally or in the alternative, the molar quantity of TACD (ai) residues in the curable polyester of the invention can be up to 60 mole %, or up to 57 mole %, or up to 55 mole %, or up to 53 mole %, or up to 50 mole %, or up to 47 mole %, or up to 45 mole %. Suitable ranges, in mole % based on the total moles of all components of the curable polyester resin, include 5-60, or 10-60, or 15-60, or 20-60, or 25-60, or 27-60, or 30-60, or 33-60, or 35-60, or 37-60, or 40-60, or 43-60, or 45-60, or 47-60, or 50-60, or 5-57, or 10-57, or 15-57, or 20-57, or 25-57, or 27-57, or 30-57, or 33-57, or 35-57, or 37-57, or 40-57, or 43-57, or 45-57, or 47-57, or 50-57, or 5-55, or 10-55, or 15-55, or 20-55, or 25-55, or 27-55, or 30-55, or 33-55, or 35-55, or 37-55, or 40-55, or 43-55, or 45-55, or 47-55, or 50-55, or 5-53, or 10-53, or 15-53, or 20-53, or 25-53, or 27-53, or 30-53, or 33-53, or 35-53, or 37-53, or 40-53, or 43-53, or 45-53, or 47-53, or 50-53, or 5-50, or 10-50, or 15-50, or 20-50, or 25-50, or 27-50, or 30-50, or 33-50, or 35-50, or 37-50, or 40-50, or 43-50, or 45-50, or 47-50, or 50-50, or 5-47, or 10-47, or 15-47, or 20-47, or 25-47, or 27-47, or 30-47, or 33-47, or 35-47, or 37-47, or 40-47, or 43-47, or 45-47, or 5-45, or 10-45, or 15-45, or 20-45, or 25-45, or 27-45, or 30-45, or 33-45, or 35-45, or 37-45, or 40-45, or 43-45.

The curable polyester resin also contains the residues of polyhydroxyl compounds (aii) other than TACD. Suitable polyhydroxyl compounds (aii), other than TACD, include compounds having at least two hydroxyl groups, or having at least three hydroxyl groups, or mixtures of compounds having two hydroxyl groups and three or more hydroxyl groups, and are compounds other than TACD. Examples of such compounds include compounds having 2-18 carbon atoms and at least two hydroxyl groups, desirably aliphatic or cycloaliphatic compounds. Specific examples of such compounds include 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, polyethylene glycol, 1,1,1-trimethylol propane, 1,1,1-trimethylolethane, glycerin, pentaerythritol, erythritol, threitol, dipentaerythritol, sorbitol, mixtures thereof, and the like.

Desirably, the polyhydroxyl compounds (a)(ii) comprise 2,2-dimethyl-1,3-propanediol (neopentyl glycol), 1,2 cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol, 1,1,1-trimethylol propane, 1,1,1-trimethylolethane, glycerin, pentaerythritol, or mixtures thereof. For example, the polyhydroxy compounds (b) can be 2,2-dimethyl-1,3-propanediol (neopentyl glycol or NPG), 1,3-cyclohexanedimethanol, 1,4 cyclohexanedimethanol, 2-methyl-1,3-propanediol, 1,1,1-trimethylol propane, 1,1,1-trimethylolethane, glycerin, pentaerythritol, or mixtures thereof.

For example, the polyhydroxyl compounds (a)(ii) can be compounds having two hydroxyl groups, or compounds having three or more hydroxyl groups, or mixtures thereof. The polyhydroxyl compounds having two hydroxyl groups can be branched or linear, saturated or unsaturated, aliphatic or cycloaliphatic $C_2$-$C_{20}$ compounds, the hydroxyl groups being primary, secondary, and/or tertiary. The polyhydroxyl compounds having 3 or more hydroxyl groups can be branched or linear, saturated or unsaturated, aliphatic or cycloaliphatic $C_2$-$C_{20}$ compounds, the hydroxyl groups being primary, secondary, and/or tertiary. The polyhydroxyl compounds having two hydroxyl groups can be branched or linear, saturated or unsaturated, aliphatic or cycloaliphatic $C_2$-$C_{20}$ compounds, the hydroxyl groups being primary, secondary, and/or tertiary. Examples of each of these compounds are given above.

The molar quantity of polyhydroxyl compounds (a)(ii), is desirably greater than 0, or at least 3, or at least 5, or at least 8, or at least 10, or at least 13, or at least 15, in each case as mole % based on 100 mole % of all polyhydroxyl compounds (a). Additionally or in the alternative, the molar quantity of polydyroxyl compounds (a)(ii) can be up to 80, or up to 60, or up to 40, or up to 30, or up to 25, or up to 20, in each case mole % based on 100 mole % of all polyhydroxyl compounds (a). Suitable ranges include greater than 0 to 80, or greater than 0 to 60, or greater than 0 to 40, or greater than 0 to 30, or greater than 0 to 25, or greater than 0 to 20, or 3 to 80, or 3 to 60, or 3 to 40, or 3 to 30, or 3 to 25, or 3 to 20, or 5 to 80, or 5 to 60, or 5 to 40, or 5 to 30, or 5 to 25, or 5 to 20, or 8 to 80, or 8 to 60, or 8 to 40, or 8 to 30, or 8 to 25, or 8 to 20, or 10 to 80, or 10 to 60, or 10 to 40, or 10 to 30, or 10 to 25, or 10 to 20, or 13 to 80, or 13 to 60, or 13 to 40, or 13 to 30, or 13 to 25, or 13 to 20, or 15 to 80, or 15 to 60, or 15 to 40, or 15 to 30, or 15 to 25, or 15 to 20, in each case mole % based on 100 mole % of all polyhydroxyl compounds (a).

The molar quantity of polyhydroxyl compounds (a)(ii) is desirably greater than 0, or at least 1, or at least 3, or at least 5, or at least 7, in each case as mole % based on curable polyester resin. Additionally or in the alternative, the molar quantity of polydyroxyl compounds (a)(ii) can be up to 40, or up to 30, or up to 20, or up to 15, or up to 12, or up to 10, in each case mole % based on the total moles of all components of the curable polyester resin. Suitable ranges, based on the total moles of all components of the curable polyester resin, include greater than 0 to 40, or greater than 0 to 30, or greater than 0 to 20, or greater than 0 to 15, or greater than 0 to 12, or greater than 0 to 10, or 1 to 40, or 3 to 30, or 3 to 20, or 3 to 15, or 3 to 12, or 3 to 10, or 5 to 40, or 5 to 30, or 5 to 20, or 5 to 15, or 5 to 12, or 5 to 10, or 7 to 40, or 7 to 30, or 7 to 20, or 7 to 15, or 7 to 12, or 7 to 10, in each case mole % based on the total moles of all components of the curable polyester resin.

Any of the amounts and ranges described with respect to the polyhydroxyl compounds (a)(ii) are also applicable to compounds having two hydroxyl groups, or compounds having 3 or more hydroxyl groups, or mixtures thereof.

The curable polyester also contains residues of (b) polycarboxylic acid compounds. Polycarboxylic acid compounds are any compounds that contain at least two carboxylic acid groups or derivatives of polycarboxylic acid compounds. As the polycarboxylic acid compounds (b), the curable polyester resin contains the residues of:
 i) polycarboxylic acid compounds, a derivative of polycarboxylic acid compound (other than (bii), or a combination thereof, and
 ii) polycarboxylic anhydride compounds.

Suitable polycarboxylic acid compounds (bi) include polycarboxylic acid compounds having at least two carboxylic acid groups. The polycarboxylic acid compounds comprise polycarboxylic acid compounds having at least two carboxylic acid groups, derivatives thereof, or combinations thereof, capable of forming an ester linkage with a polyhydroxyl component, other than a polycarboxylic anhydride compound. Derivatives of the polycarboxylic acid compounds include dimethyl ester or other dialkyl esters of the diacid, or diacid chloride or other diacid halides, other than the polycarboxylic anhydride. The polycarboxylic acid compounds can be tricarboxylic polycarboxylic acid compounds or derivatives thereof.

Examples of polycarboxylic acid compounds (bi) that may be used include aliphatic polycarboxylic acids, cycloaliphatic polycarboxylic acids, aromatic polycarboxylic acids, derivatives of each, or mixtures of two or more of these acids. Specific examples include isophthalic acid (or dimethyl isophthalate), terephthalic acid (or dimethyl terephthalate), phthalic acid, 1,4-cyclohexanedicarboxylic acid, 1,3-cyclohexanedicarboxylic acid, dodecanedioic acid, sebacic acid, azelaic acid, maleic acid, fumaric acid, succinic acid, adipic acid, trimellitic acid, citric acid, tartaric acid, 2,6-naphthalenepolycarboxylic acid, glutaric acid, itatonic acid, and their derivatives, diglycolic acid; 2,5-norbornanepolycarboxylic acid; 1,4-naphthalenepolycarboxylic acid; 2,5-naphthalene polycarboxylic acid; diphenic acid; 4,4'-oxydibenzoic acid; 4,4'-sulfonyidibenzoic acid, or mixtures thereof.

The polycarboxylic acid compounds (bi) can be a combination of aromatic polycarboxylic acid compounds and either or both of aliphatic or cycloaliphatic polycarboxylic acid compounds. For example, the polycarboxylic acid compounds can include aromatic polycarboxylic acid compounds and aliphatic polycarboxylic acids compounds having 2 to 22 carbon atoms; or aromatic polycarboxylic acid compounds and cycloaliphatic polycarboxylic acids compounds having 2 to 22 carbon atoms; or aromatic polycarboxylic acid compounds, aliphatic polycarboxylic acids compounds having 2 to 22 carbon atoms; and cycloaliphatic polycarboxylic acids compounds having 2 to 22 carbon atoms.

If desired, the poycarboxylic acid compounds (b) do not include terephtalic acid or a derivative of terephthalic acid.

More specific examples of some of the suitable polycarboxylic acids b(i) and/or combinations thereof include:
 a) (isophthalic acid (or dimethyl isophthalate)) and (1,4-cyclohexanedicarboxylic acid, 1,3-cyclohexanedicarboxylic acid, or mixtures thereof); or
 b) (isophthalic acid (or dimethyl isophthalate)) and (dodecanedioic acid, sebacic acid, azelaic acid, maleic acid, fumaric acid, succinic acid, adipic acid, glutaric acid, itatonic acid, diglycolic acid; or mixtures thereof); or
 c) (isophthalic acid (or dimethyl isophthalate)); or (1,4-cyclohexanedicarboxylic acid, 1,3-cyclohexanedicarboxylic acid, or mixtures thereof) and (dodecanedioic acid, sebacic acid, azelaic acid, maleic acid, fumaric acid, succinic acid, adipic acid, glutaric acid, itatonic acid, diglycolic acid, or mixtures thereof), or
 d) 1,4-cyclohexanedicarboxylic acid.

In each of examples (a)-(d), terephthalic acid or derivatives thereof is not included.

The molar quantity of polycarboxylic acid compounds (bi) used to make the curable polyester of the invention can be at least 65 mole %, or at least 70 mole %, or at least 80 mole %, based on the 100 mole % of total moles of polycarboxylic acid compounds (b). Additionally or in the alternative, the molar quantity of polycarboxylic anhydride compounds (bii) used to make the curable polyester of the invention can be up to 96 mole %, or up to 95 mole %, or up to 93 mole %, or up to 92 mole %, or up to 91 mole %, or up to 90 mole %, based on the total moles of all components of the curable polyester resin. Suitable ranges, in mole % based on 100 mole % of the total moles of polycarboxylic acids (b), include 65-96, or 70-96, or 80-96, or 65-95, or 70-95, or 80-95, or 65-93, or 70-93, or 80-93, or 65-92, or 70-92, or 80-92, or 65-91, or 70-91, or 80-91, or 65-90, or 70-90, or 80-90.

The curable polyester resin also contains residues of a polycarboxylic anhydride compound(s) (bii). Polycarboxylic anhydride compounds (bii) include the anhydrides of any one of the types of polycarboxylic acid compounds described in the list of polycarboxylic acid compounds (bi).

This would include the anhydrides of polycarboxlic acids having at least two acyl groups bonded to the same oxygen atom. The anhydrides compounds (bii) comprise the anhydride of any one of the polycarboxylic acid compounds (bi) having at least two carboxylic acid groups, capable of forming an ester linkage with the polyhydroxyl compounds (a). The anhydrides can be symmetrical or unsymmetrical (mixed) anhydrides. The anhydrides have at least one anhydride group, and can include two, three, four, or more anhydride groups.

Suitable polycarboxylic anhydrides include acetic anhydride, propionic anhydride, butyric anhydride, isobutyric anhydride, pivalic anhydride, valeric anhydride, isovaleric anhydride, 2-methyl butyric anhydride, 2-ethyl butyric anhydride, caproic anhydride, caprylic anhydride, glutaric anhydride, isocaproic anhydride, n-heptanoic anhydride, nonoic anhydride, decanoic anhydride, neodecanoic anhydride, undecanoic anhydride, neoheptanoic anhydride, lauric anhydride, tridecanoic anhydride, 2-ethyl hexanoic anhydride, acetic propionic anhydride, acetic isobutyric anhydride, myristic anhydride, palmitic anhydride, stearic anhydride, phenylacetic anhydride, cyclohexanecarboxylic anhydride, 3-methyl-cyclopentanecarboxylic anhydride, beta-methoxy propionic anhydride, alpha-ethoxy butyric anhydride, benzoic anhydride, o-, m-, and p-toluic anhydride, 2,4,6-trimethylbenzoic anhydride, o-, m-, and p-chlorobenzoic anhydride, o-, m-, and p-bromobenzoic anhydride, o-, m-, and p-nitrobenzoic anhydride, o- and p-hydroxybenozic anhydride, o-, m-, and p-aminobenzoic anhydride, and o-, m-, and p-methoxybenzoic anhydride, phthalic anhydride, 2-butenoic anhydride, dodecanedioic anhydride, sebacic anhydride, azelaic anhydride, maleic anhydride, succinic anhydride, adipic anhydride, glutaric anhydride, itatonic anhydride, tetrahydrophthalic anhydride, hexahydrophthalic anhydride, suceinic anhydride, norbornene anhydride, diglycolic anhydride, naphthalenetetracarboxylic dianhydride, pyromellitic dianhydride, 3,3',4,4'-oxydiphtalic dianhydride, 3,3',4,4'-benzophenone tetracarboxylic dianhydride, 4,4'-diphtalic(hexafluoroisopropylidene) anhydride, benzoquinonetetracarboxylic dianhydride, ethylenetetracarboxylic dianhydride, trimellitic anhydride, or mixtures thereof.

Desirably, the anhydride used can be isobutyric anhydride, acetic anhydride, pivalic anhydride, isovaleric anhydride, neodecanoic anhydride, neoheptanoic anhydride, and 2-ethyl hexanoic anhydride, phthalic anhydride, sebacic anhydride, maleic anhydride, succinic anhydride, adipic anhydride, glutaric anhydride, tetrahydrophthalic anhydride, hexahydrophthalic anhydride, naphthalenetetracarboxylic dianhydride, pyromellitic dianhydride, 3,3',4,4'-oxydiphtalic dianhydride, 3,3',4,4'-benzophenone tetracarboxylic dianhydride, benzoquinonetetracarboxylic dianhydride, ethylenetetracarboxylic dianhydride, trimellitic anhydride, or mixtures thereof.

The molar quantity of polycarboxylic anhydride compounds (bii) used to make the curable polyester of the invention can be at least 4 mole %, or at least 5 mole %, or at least 7 mole %, or at least 8 mole %, or at least 9 mole %, or at least 10 mole %, based on the total moles of polycarboxylic acid compounds (b). Additionally or in the alternative, the molar quantity of polycarboxylic anhydride compounds (bii) used to make the curable polyester of the invention can be up to 35 mole %, or up to 30 mole %, or up to 20 mole %, or up to 16 mole %, or up to 14 mole %, or up to 12 mole %, based on the total moles of all components of the curable polyester resin. Suitable ranges, in mole % based on the total moles of polycarboxylic acids (b), include 4-35, or 5-35, or 7-35, or 8-35, or 9-35, or 10-35, or 4-30, or 5-30, or 7-30, or 8-30, or 9-30, or 10-30, or 4-20, or 5-20, or 7-20, or 8-20, or 9-20, or 10-20, or 4-16, or 5-16, or 7-16, or 8-16, or 9-16, or 10-16, or 4-14, or 5-14, or 7-14, or 8-14, or 9-14, or 10-14, or 4-12, or 5-12, or 7-12, or 8-12, or 9-12, or 10-12. In general, the ranges will be, in mole % based on the total moles of polycarboxylic acids (b), 8-35, or 10-35, or 8-30, or 10-30, or 8-20, or 10-20.

The molar quantity of polycarboxylic anhydride compounds (bii) used to make the curable polyester of the invention can be at least 0.5 mole %, or at least 1 mole %, or at least 1.5 mole %, or at least 2 mole %, or at least 2.5 mole %, or at least 3 mole %, or at least 3.5 mole %, or at least 4 mole %, or at least 4.5 mole %, based on the total moles of all components of the curable polyester resin. Additionally or in the alternative, the molar quantity of polycarboxylic anhydride compounds (bii) used to make the curable polyester of the invention can be up 15 mole %, or up to 10 mole %, or up to 8 mole %, or up to 7 mole %, or up to 6 mole %, based on the total moles of all components of the curable polyester resin. Suitable ranges, in mole % based on the total moles of all components of the curable polyester resin, include 0.5-15, or 1-15, or 1.5-15, or 2-15, or 2.5-15, or 3-15, or 3.5-15, or 4-15, or 4.5-15, or 0.5-10, or 1-10, or 1.5-10, or 2-10, or 2.5-10, or 3-10, or 3.5-10, or 4-10, or 4.5-10, or 0.5-8, or 1-8, or 1.5-8, or 2-8, or 2.5-8, or 3-8, or 3.5-8, or 4-8, or 4.5-8, or 0.5-7, or 1-7, or 1.5-7, or 2-7, or 2.5-7, or 3-7, or 3.5-7, or 4-7, or 4.5-7, or 0.5-6, or 1-6, or 1.5-6, or 2-6, or 2.5-6, or 3-6, or 3.5-6, or 4-6, or 4.5-6. In general, the ranges will be, in mole % based on the total moles of all components of the curable polyester resin, 3.5-10, or 4-10, or 4.5-10, or 3.5-8, or 4-8, or 4.5-8, or 3.5-7, or 4-7, or 4.5-7, or 3.5-6, or 4-6, or 4.5-6.

The molar ratio of (a) polyhydroxyl compounds to (bi) polycarboxylic acid compounds used in the process of making the curable polyester of the invention is desirably about 0.9:1 to 1.45:1, or 0.95:1 to 1.1:1. A molar excess of polyhydroxyl compounds (a) can be used to ensure complete reaction with all carboxylic acid groups on the polycarboxylic acid compounds (bi). However, it is not necessary to reduce the acid number close to zero at the stage of making an intermediate polyester polymer since the curable polyester resin will have an acid number of at least 20.

The curable polyester resin has an acid number ranging from about 20 to about 120 mg KOH/g and a hydroxyl number ranging from greater than 0 to about 100 mg KOH/g.

The acid number of the curable polyester resin can be from 20 to 120, or from 25 to 120, or from 30 to 120, or from 35 to 120, or from 40 to 120, or from 45 to 120, or from 50 to 120, or from 55 to 120, or from 60 to 120, or from 65 to 120, or from 70 to 120, or from 75 to 120, or from 80 to 120, or from 85 to 120, or from 90 to 120, or from 95 to 120, or from 20 to 100, or from 25 to 100, or from 30 to 100, or from 35 to 100, or from 40 to 100, or from 45 to 100, or from 50 to 100, or from 55 to 100, or from 60 to 100, or from 65 to 100, or from 70 to 100, or from 75 to 100, or from 80 to 100, or from 85 to 100, or from 90 to 100, or from 20 to 90, or from 25 to 90, or from 30 to 90, or from 35 to 90, or from 40 to 90, or from 45 to 90, or from 50 to 90, or from 55 to 90, or from 60 to 90, or from 65 to 90, or from 70 to 90, or from 75 to 90, or from 80 to 90, or from 20 to 85, or from 25 to 85, or from 30 to 85, or from 35 to 85, or from 40 to 85, or from 45 to 85, or from 50 to 85, or from 55 to 85, or from 60 to 85, or from 65 to 85, or from 70 to 85, or from 75 to 85, or from 20 to 80, or from 25 to 80, or from 30 to 80, or from 35 to 80, or from 40 to 80, or from 45 to 80, or from 50 to 80, or from 55 to 80, or from 60 to 80, or from 65 to 80, or from 70 to 80, or from 75 to 80, or from 20 to 75, or from 25 to 75, or from 30 to 75, or from 35 to 75, or from 40 to 75, or from 45 to 75, or from 50 to 75, or from 55 to 75, or from 60 to 75, or from 65 to 75, or from 20 to 50, or from 25 to 50, or from 30 to 50, or from 35 to 50, or from 40 to 50, or from 45 to 50, or from 20 to 45, or from 25 to 45, or from 30 to 45, or from 35 to 45, or from 40 to 45, or from 20 to 40, or from 25 to 40, or from 30 to 40, or from 35 to 40, or from 20 to 35, or from 25 to 35.

The particular acid number can vary depending on the application and the curing system used. For example, if one desires, the curable polyester resin can be formulated to have an acid number that is:
  a) from 50 to 120, or from 50 to 100, or within any of the above stated ranges having an acid number of at least 50, for or in aqueous dispersions and waterborne coating applications, to impart sufficient water dispersibility after neutralization; or
  b) 20 to 50 or within any of the above stated ranges having an acid number not exceeding 50, for or in solvent-based solutions and coating applications, to enhance solubility and lower the solution viscosity.

The hydroxyl number can be within a range of from greater than 0 to 100 mg KOH/g. Suitable ranges of hydroxyl number include greater than 0 to 100, or from 5 to 100, or from 10 to 100, or from 15 to 100, or from 20 to 100, or from 3 to 100, or from 25 to 100, or from 35 to 100, or from 40 to 100, or from 45 to 100, or from 50 to 100, or from 55 to 100, or from 60 to 100, or from 65 to 100, or from 70 to 100, or from 75 to 100, or from 80 to 100, or from 85 to 100, or from 90 to 100, greater than 0 to 90, or from 3 to 90, or from 5 to 90, or from 10 to 90, or from 15 to 90, or from 20 to 90, or from 25 to 90, or from 35 to 90, or from 40 to 90, or from 45 to 90, or from 50 to 90, or from 55 to 90, or from 60 to 90, or from 65 to 90, or from 70 to 90, or from 75 to 90, or from 80 to 90, greater than 0 to 85, or from 3 to 85, or from 5 to 85, or from 10 to 85, or from 15 to 85, or from 20 to 85, or from 25 to 85, or from 35 to 85, or from 40 to 85, or from 45 to 85, or from 50 to 85, or from 55 to 85, or from 60 to 85, or from 65 to 85, or from 70 to 85, or from 75 to 85, greater than 0 to 80, or from 3 to 80, or from 5 to 80, or from 10 to 80, or from 15 to 80, or from 20 to 80, or from 25 to 80, or from 35 to 80, or from 40 to 80, or from 45 to 80, or from 50 to 80, or from 55 to 80, or from 60 to 80, or from 65 to 80, or from 70 to 80, or from 75 to 80, or from greater than 0 to 75, or from 3 to 75, or from 5 to 75, or from 10 to 75, or from 15 to 75, or from 20 to 75, or from 25 to 75, or from 35 to 75, or from 40 to 75, or from 45 to 75, or from 50 to 75, or from 55 to 75, or from 60 to 75, or from 65 to 75, or from greater than 0 to 70, or from 3 to 70, or from 5 to 70, or from 10 to 70, or from 15 to 70, or from 20 to 70, or from 25 to 70, or from 35 to 70, or from 40 to 70, or from 45 to 70, or from 50 to 70, or from 55 to 70, or from 60 to 70, or from greater than 0 to 65, or from 3 to 65, or from 5 to 65, or from 10 to 65, or from 15 to 65, or from 20 to 65, or from 25 to 65, or from 35 to 65, or from 40 to 65, or from 45 to 65, or from 50 to 65, or from 55 to 65, or from greater than 0 to 60, or from 3 to 60, or from 5 to 60, or from 10 to 60, or from 15 to 60, or from 20 to 60, or from 25 to 60, or from 35 to 60, or from 40 to 60, or from 45 to 60, or from 50 to 60, or from 55 to 60, or from greater than 0 to 55, or from 3 to 55, or from 5 to 55, or from 10 to 55, or from 15 to 55, or from 20 to 55, or from 25 to 55, or from 35 to 55, or from 40 to 55, or from 45 to 55, or from 50 to 55, or from greater than 0 to 50, or from 3 to 50, or from 5 to 50, or from 10 to 50, or from 15 to 50, or from 20 to 50, or from 25 to 50, or from 35 to 50, or from 40 to 50, or from greater than 0 to 45, or from 3 to 45, or from 5 to 45, or from 10 to 45, or from 15 to 45, or from 20 to 45, or from 25 to 45, or from 35 to 45, or from greater than 0 to 40, or from 3 to 40, or from 5 to 40, or from 10 to 40, or from 15 to 40, or from 20 to 40, or from 25 to 40, or from 35 to 40, or from greater than 0 to 35, or from 3 to 35, or from 5 to 35, or from 10 to 35, or from 15 to 35, or from 20 to 35, or from 25 to 35.

Any one of the hydroxyl number ranges can be combined with any one of the acid number ranges. Non-limiting examples of combinations include those identified in Table 1 below. The "x" in each box indicates a suitable combination of OH# and Acid # ranges.

TABLE 1

| OH # | Acid # | | | | | | | | | | | | | |
|---|---|---|---|---|---|---|---|---|---|---|---|---|---|---|
| | 20-120 | 20-50 | 20-45 | 50-120 | 50-100 | 50-90 | 60-100 | 65-100 | 70-100 | 45-90 | 50-85 | 60-90 | 65-90 | 30-90 |
| 0-100 | x | x | x | x | x | x | x | x | x | x | x | x | x | x |
| 1-100 | x | x | x | x | x | x | x | x | x | x | x | x | x | x |
| 5-100 | x | x | x | x | x | x | x | x | x | x | x | x | x | x |
| 5-90 | x | x | x | x | x | x | x | x | x | x | x | x | x | x |
| 5-75 | x | x | x | x | x | x | x | x | x | x | x | x | x | x |
| 5-60 | x | x | x | x | x | x | x | x | x | x | x | x | x | x |
| 5-50 | x | x | x | x | x | x | x | x | x | x | x | x | x | x |
| 5-40 | x | x | x | x | x | x | x | x | x | x | x | x | x | x |
| 20-90 | x | x | x | x | x | x | x | x | x | x | x | x | x | x |
| 20-75 | x | x | x | x | x | x | x | x | x | x | x | x | x | x |
| 20-70 | x | x | x | x | x | x | x | x | x | x | x | x | x | x |
| 20-65 | x | x | x | x | x | x | x | x | x | x | x | x | x | x |
| 20-60 | x | x | x | x | x | x | x | x | x | x | x | x | x | x |
| 20-50 | x | x | x | x | x | x | x | x | x | x | x | x | x | x |
| 20-45 | x | x | x | x | x | x | x | x | x | x | x | x | x | x |
| 20-40 | x | x | x | x | x | x | x | x | x | x | x | x | x | x |
| 40-100 | x | x | x | x | x | x | x | x | x | x | x | x | x | x |
| 50-100 | x | x | x | x | x | x | x | x | x | x | x | x | x | x |
| 60-100 | x | x | x | x | x | x | x | x | x | x | x | x | x | x |

The ratio of acid number to hydroxyl number (AN:OH) in the curable polyester resins of the invention is at least 0.5:1. The particular acid number and hydroxyl number selected within each of the above described ranges and combination of ranges should be at or above this minimum AN:OH ratio. Having a suitable amount of acid end groups contributes toward the improvement in the curing rate and hardness of the coating. The ratio can be at least 0.6:1, or at least 0.7:1, or at least 0.8:1, or at least 0.9:1, or at least 1:1, or at least 1.1:1, or at least 1.2:1, or at least 1.3:1, or at least 1.4:1, or at least 1.5:1, or at least 1.6:1, or at least 1.7:1, or at least 1.8:1, or at least 1.9:1, or at least 2:1, or at least 2.1:1, or at least 2.2:1, or at least 2.3:1, or at least 2.4:1, or at least 2.5:1, or at least 2.6:1, or at least 2.7:1, or at least 2.8:1, or at least 2.9:1, or at least 3:1, or at least 3.5:1, or at least 4:1, or at least 5:1, or at least 6:1, and in each of the foregoing ratios, there is no particular upper limit, although practically the ratio is likely not needed to exceed 20:1. For example, the ratio does not need to exceed 15:1, or not to exceed 10:1, or not to exceed 8:1, or not to exceed 6:1, or not to exceed 5:1, or not to exceed 4:1, or not even to exceed 3:1 in order to obtain coatings having good hardness.

Suitable combinations of ranges for the AN:OH ratio are as set forth in Table 2 below, in which an x designated a contemplate ranges at the lower and upper ends of the selected range.

The carboxyl-functional polyester of this invention has the ability to cure phenolic resins (or phenoplast) quite well in comparison to those curable polyester resins having hydroxyl functionalities with little or no acid end groups. In another example, when the crosslinking agent is a phenolic resin, the acid number of the polyester can be from 50 to 100 and hydroxyl number is 10 to 50.

The acid number mentioned herein can be measured by the ASTM D1639-90 test method. The hydroxyl numbers mentioned herein can be measured by ASTM D4274-11 test method The glass transition temperature (Tg) of the curable polyester of the present invention may be from −20° C. to 120° C., from 10° C. to 110° C., from 20° C. to 105° C., from 30° C. to 100° C., from 40° C. to 95° C., from 40° C. to 85° C., from 35° C. to 85° C., from 50° C. to 90° C., from 55° C. to 95° C., from 60° C. to 95° C., from 65° C. to 95° C., from 70° C. to 95° C., or from 75° C. to 90° C. The Tg is measured on the dry polymer using standard techniques, such as differential scanning calorimetry ("DSC"), well

TABLE 2

Ranges of AN:OH Ratios

| Upper End | Lower End | | | | | | | | | | | | | |
|---|---|---|---|---|---|---|---|---|---|---|---|---|---|---|
| | 0.5:1 | 0.6:1 | 0.8:1 | 1:1 | 1.1:1 | 1.3:1 | 1.4:1 | 1.5:1 | 1.6:1 | 2:1 | 2.5:1 | 2.6:1 | 3:1 | 4:1 |
| 20:1 | x | x | x | x | x | x | x | x | x | x | x | x | x | x |
| 15:1 | x | x | x | x | x | x | x | x | x | x | x | x | x | x |
| 10:1 | x | x | x | x | x | x | x | x | x | x | x | x | x | x |
| 8:1 | x | x | x | x | x | x | x | x | x | x | x | x | x | x |
| 6:1 | x | x | x | x | x | x | x | x | x | x | x | x | x | x |
| 5:1 | x | x | x | x | x | x | x | x | x | x | x | x | x | x |
| 4:1 | x | x | x | x | x | x | x | x | x | x | x | x | x | x |
| 3:1 | x | x | x | x | x | x | x | x | x | x | x | x | x | x |

As mentioned above, the particular acid number and hydroxyl number within any given range is selected so as to satisfy the AN:OH ratio of at least 0.5:1. Additional examples of suitable AN ranges, OH ranges, and AN:OH ratios are set forth in Table 3, in which an x in a box designates a suitable combination of all three.

known to persons skilled in the art. The Tg measurements of the polyesters are conducted using a "dry polymer," that is, a polymer sample in which adventitious or absorbed water is driven off by heating to polymer to a temperature of about 200° C. and allowing the sample to return to room temperature. Typically, the polyester is dried in the DSC apparatus

TABLE 3

| | Acid # | | | | | | | | | | | | | |
|---|---|---|---|---|---|---|---|---|---|---|---|---|---|---|
| OH # | 20-120 | 20-50 | 20-45 | 50-120 | 50-100 | 50-90 | 60-120 | 65-100 | 70-100 | 45-90 | 50-85 | 60-90 | 65-90 | 30-90 |
| 0-100 | x | x | x | x | x | x | x | x | x | x | x | x | x | x |
| 1-100 | x | x | x | x | x | x | x | x | x | x | x | x | x | x |
| 5-100 | x | x | x | x | x | x | x | x | x | x | x | x | x | x |
| 5-90 | x | x | x | x | x | x | x | x | x | x | x | x | x | x |
| 5-75 | x | x | x | x | x | x | x | x | x | x | x | x | x | x |
| 5-60 | x | x | x | x | x | x | x | x | x | x | x | x | x | x |
| 5-50 | x | x | x | x | x | x | x | x | x | x | x | x | x | x |
| 5-40 | x | x | x | x | x | x | x | x | x | x | x | x | x | x |
| 15-90 | | | | x | | x | x | x | x | | x | x | x | |
| 15-75 | | | | x | | x | x | x | x | | x | x | x | |
| 20-70 | | | | x | x | | x | | x | | x | x | | |
| 20-65 | | | | x | x | | x | | x | | x | x | | |
| 20-60 | | | | x | x | | x | | x | | x | x | | |
| 20-50 | | | | x | | | x | | x | | x | x | | |
| 15-45 | | | | x | x | x | x | x | x | | x | x | x | |
| 10-40 | | | | x | x | x | x | x | x | x | x | x | x | x |
| 40-100 | | | | x | | | x | | | | | | | |
| 50-100 | | | | | | | x | | | | | | | |
| 60-100 | | | | | | | x | | | | | | | |
| AN:OH Ratio | 0.5:1-20:1 | 0.8:1-10:1 | 1:1-6:1 | 0.5:1-3:1 | 0.8:1-5:1 | 1.5:1-5:1 | 0.5:1-2:1 | 1:1-6:1 | 0.5:1-4:1 | 1.3:1-6:1 | 2:1-4:1 | 0.5:1-3:1 | 1.5:1-5:1 | 1:1-8:1 | by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement.

The weight average molecular weight (Mw) of the curable polyester of the present invention is not limited, and may be from 2,500 to 50,000, from 2,500 to 30,000, from 2,500 to 20,000, from 2,500 to 15,000, from 2,500 to 12,500, or from 2,500 to 10,000, in each case g/mole. The Mw is measured by gel permeation chromatography (GPC) using polystyrene equivalent molecular weight.

The number average molecular weight (Mn) of the curable polyester of the present invention is not limited, and may be from 1,000 to 20,000, from 1,000 to 15,000, from 1,000 to 12,500, from 1,000 to 10,000, from 1,000 to 8,000, from 1,000 to 6,000, from 1,000 to 5,000, from 1,000 to 4000, from 1,000 to 3,000, from 1,000 to 2,500, from 1,000 to 2,250, or from 1,000 to 2,000, from 1,100 to 4000, from 1,100 to 3,000, from 1,100 to 2,500, from 1,100 to 2,250, or from 1,100 to 2,000 in each case g/mole. The Mn is measured by gel permeation chromatography (GPC) using polystyrene equivalent molecular weight.

This polyester desirably has a low or mid molecular weight, typically an Mn from 1000 to about 20,000 to render it suitable for coating applications. Desirably, the molecular weight of the curable polyester resin is not suitable for the fabrication of films, sheets, and other shaped objects by extrusion, casting, blow molding, and other thermoforming processes commonly used for higher molecular weight thermoplastic polymers There is also provided a curable polyester resin comprising the residues of:
  a) polyhydroxyl compounds comprising:
    i) 2,2,4,4-tetraalkylcyclobutane-1,3-diol (TACD) compounds in an amount ranging from about 60 to 97 mole %, based on the total moles of polyhydroxyl compounds (a), and
    ii) polyhydroxyl compounds other than TACD comprising
      (1) a diol in an amount ranging from 0 to 37 mole %, based on the total moles of (a), and
      (2) a polyhydroxyl compound having 3 or more hydroxyl groups in an amount ranging from 3 to 15 mole %, based on the total moles of (a), and
  b) polycarboxyl compounds comprising
    i) a polycarboxylic acid, a derivative of polycarboxylic acid compound (other than bii)), or a combination thereof in an amount ranging from 75 to 90 mole %, based on the total moles of (b), and
    ii) a polycarboxylic anhydride in an amount ranging from 10 to 25 mole %, based on the total moles of (b),
wherein said polyester has an acid number ranging from about 30 to about 100 mg KOH/g and a hydroxyl number ranging from 3 to about 80 mg KOH/g with an AN:OH ratio of at least 0.5:1. The ranges of acid numbers, hydroxyl numbers, AN:OH ratios, the combinations of each of these, as well as the diols, polycarboxylic acids (b) and anhydrides, Mn, Mw, and molar quantities for each ingredient that are mentioned above (including Tables 1, 2, and 3) are also applicable to these curable polyester resins.

Desirably, in any of the embodiments of the invention: the (a)(ii)(1) diol can be 2,2-dimethyl-1,3-propanediol (neopentyl glycol), 1,3-cyclohexanedimethanol, 1,4-cyclohexanedimethanol, or 2-methyl-1,3-propanediol or combinations thereof; the (a)(ii)(2) polyhydroxyl compound having 3 or more hydroxyl groups can be 1,1,1-trimethylol propane, 1,1,1-trimethylolethane, glycerin, pentaerythritol, sorbitol, or 1,2,6-hexanetriol, or combinations thereof; the (b)(i) polycarboxylic acid can be isophthalic acid (or dimethyl isophthalate), terephthalic acid (or dimethyl terephthalate), 1,4-cyclohexanepolycarboxylic acid, 1,3-cyclohexanepolycarboxylic acid, trimesic acid, citric acid, tartaric acid, trimellitic acid, or adipic acid or combinations thereof; and/or the (b)(ii) polycarboxylic anhydride (b)(ii) can be trimellitic anhydride, hexahydrophthalic anhydride, pyromellitic anhydride, maleic anhydride, succinic anhydride, or combinations thereof.

The polyhydroxyl compound having 3 or more hydroxyl groups (a)(ii)(2) may be added to the polyester reaction mixture or blended with the polyester in the form of a concentrate as described, for example, in U.S. Pat. Nos. 5,654,347 and 5,696,176, whose disclosure regarding branching monomers and their method of addition is incorporated herein by reference.

There is also provided a method for the preparation of the curable polyester of the invention, comprising the steps of:
  a) a first stage for making a polyester intermediate composition by combining the polyhydroxyl compounds and polycarboxylic acid compounds to form a reaction mixture, and reacting the reaction mixture in a reactor at a temperature from 180-250° C., optionally in the presence of an acid catalyst until the reaction mixture has an acid number of 0 to 20 mg KOH/g and,
  b) thereafter a second stage for forming a curable polyester composition by reacting a polycarboxylic anhydride with the reaction mixture at a temperature of 140° C. to 180° C. to thereby obtain a polyester composition having an acid number of greater than 20 mg KOH/g.

Desirably, the reaction mixture is allowed to cool to below 180° C. prior to the addition of the polycarboxylic anhydride.

Desirably, the curable polyester composition is withdrawn from the reactor. The curable polyester composition removed from the reactor can be allowed to cool to room temperature and isolated, or fed warm to a blending tank to formulate with other ingredients.

The process for making a curable polyester resin has a first step (a) of forming a polyester intermediate composition by reacting polyhydroxyl compounds (a) and polycarboxylic acid compounds (bi) in at least one reactor at a temperature from 180-250° C., optionally in the presence of an acid catalyst, until a reaction mixture having an acid number of 0 to about 20 mg KOH/g is obtained. Desirably, a distillate is removed from the reactor during step (a).

The process for the manufacture of the polyester intermediate composition can be batchwise or continuous. The reaction of the polyhydroxyl compounds (a) and the polycarboxylic acid compounds (bi) may be carried out in a melt phase process using conventional polyester polymerization conditions. The polyhydroxyl compounds and polycarboxylic acid compounds are combined to form a reaction mixture, and the reaction mixture is reacted in an esterification reactor at a temperature from 180-250° C. The reaction continues until the reaction mixture has an acid number of 0 to about 20 mg KOH/g.

The esterification reaction many take place in one or more esterification reactors. The polyester intermediate composition can be made by a transesterification (ester interchange) reaction or by direct esterification. For example, polycarboxylic acid compounds (for direct esterification) or ester forms of the polycarboxylic acid compounds (for transesterification), and the polyhydroxyl compounds including the TACD and any other polyhydroxyl compounds, can be fed to an esterification reactor either in a combined stream, separate streams, or a combination of a combined and separate stream, and reacted at elevated temperatures, typically, from about 180° C. to about 250° C. While temperatures in excess of 250° C. can be employed, such as temperature up to 280° C., in many instances color bodies and degradation products start to form at temperatures exceeding 250° C. Desirably, the reaction mixture is reacted at any temperature within a range from about 180° C. to about 230° C. In the esterification reactor, the temperature of the reaction mixture to form the polyester intermediate composition may be static or may be increased stepwise or continuously if desired.

It is desirable to start the reaction at a temperature below 210° C., or at 200° C. or less, or even at 180° C. or less, and increase the temperature over the total residence time of the reaction mixture for making the polyester intermediate composition in order to avoid generating more water by-product than the distillate collection system can efficiently remove. The reaction in the first stage desirably proceeds at a temperature of at least 180° C., or at least 190° C., or at least 200° C. for at least 50%, or at least 60%, or at least 70%, or at least 80%, or at least 90% of the residence time of the reaction measured as commencing on when the temperature within the reactor reaches 160° C. or more and ending when the acid number of the reaction mixture reaches or falls through 20 mg KOH/g.

To assist driving the reaction of the polyhydroxyl component and acid component to completion with a reduction in the acid number to 20 mg KOH/g or less, and to obtain a polyester intermediate having hydroxyl functionality where such is desired for assisting with crosslinking reactions in a coating composition, it is desirable to react about 1.05 to about 1.6, or 1.1-1.5, or 1.1-1.4 equivalents of polyhydroxyl compounds (b) to one equivalent of the polycarboxylic acid compounds (bi).

The minimum residence time is determined by reaching an acid number of 20 or less. The amount of time required to reach an acid number of 20 or less depends on the types of reactants used, the operating temperature profile, reaction mixture volume, reactor pressure, and efficiency of the distillate collection. The acid number of the reaction mixture can be determined analytically or by residence time at a given set of reaction conditions by empirical experience. The residence time to make the polyester intermediate composition to an acid number of 20 or less can range from 0.5 hours to about 10 hours, or from 2 hours to 8 hours. In some cases, an acid number of 20 or less can be obtained between 2 hours to 6 hours, or in 2 to 5 hours.

Desirably, a distillate is removed from the reactor during step (a). The esterification reactor should be equipped with, and the process for making the polyester intermediate composition operated with, a distillate collection system for removing esterification or ester-exchange vapor by-products since their removal will assist with shifting the equilibrium reaction to the formation of the ester. The typical by-products formed in esterification are water in direct esterification routes, alcohols in transesterification routes, along with other reaction by-products such as aldehydes and color bodies. The method for the removal of reaction by-products is not limited. A common method for the removal of esterification reaction by-products is a vacuum system connected to the esterification reaction zone in the reactor with a direct contact spray condenser, which is useful when a vacuum is applied to the esterification reaction zone in the esterification reactor, or a distillation column that is packed or contains trays in vapor communication with the esterification vessel for the separation of water from other reaction by-products. The distillate is desirably continuous for at least a portion of the residence time during which the reaction mixture is reacting prior to reaching an acid number of 20 mg KOH/g. Desirably, the distillate is collected continuously from the time collection begins to a time when the acid number falls to or through 20 mg KOH/g.

The process for making the polyester intermediate can be conducted under a pressure within a range of 0 psig or atmospheric to about 200 psig, or from about 0 psig to about 100 psig, or from 0 psig to 40 psig. However, if desired, at least a portion or the entire residence time of the reaction to make the polyester intermediate composition can proceed under a vacuum. If a vacuum is applied to only a portion of the residence time, it can be applied starting when at least 30%, or at least 50%, or at least 75%, or at least 80%, or at least 90% of the residence time for making the polyester (from reaching a temperature of at least 160° C. until the acid number reaches or falls through 20 mg KOH/g) intermediate has expired and before the polycarboxylic anhydride is added. By applying a vacuum, the removal of the water or alcohol condensate can be further enhanced, and the molecular weight Mn of the polyester can be increased. If a vacuum is applied, suitable pressures can range from 759 torr down to 0.5 torr, or 600 torr down to 0.5 torr, or 450 torr down to 0.5 torr. Vacuum can be increased with the residence time of the reaction mixture. Alternatively or in addition to the application of a vacuum, the removal of the reaction by-products can be purged or swept with an inert gas during all or a portion of the reaction. An inert gas is any gas which does not cause unwanted reaction or product characteristics at reaction conditions. Suitable gases include, but are not limited to, carbon dioxide, argon, helium, and nitrogen.

The esterification vessel can be agitated if desired to assist with the mass transfer of reactants and disengagement of reaction by-products.

The reaction to make the polyester intermediate is facilitated by reacting the polyhydroxyl compounds and the polycarboxylic acid compounds (bi) in the presence of appropriate catalysts such as, for example, alkoxy titanium compounds, alkali metal hydroxides and alcoholates, salts of organic carboxylic acids, alkyl tin compounds, metal oxides, and other metal carboxylates or benzoates such as zinc, manganese, or magnesium acetates or benzoates. A typical catalyst is an organometallic acid catalyst, such as, for a carboxylate of tin, e.g. butylstannoic acid. The amount of the catalyst added may be determined by routine experimentation as understood by those skilled in the art. The catalyst can be added in amounts ranging from about 0.01 to 1.0 weight percent, based on the total weight of the reactants.

In a continuous process, the polycarboxylic acid compounds and the polyhydroxyl compounds are continuously fed to the esterification reactor, the polyester intermediate composition is continuously withdrawn from the esterification reactor and fed to a second esterification reactor continuously to form the curable polyester composition, and the curable polyester composition is continuously withdrawn from the second esterification reactor.

Once the desired acid number of the reaction mixture to make the polyester intermediate composition (20 mg KOH/g or less), the temperature of the polyester intermediate composition is desirably reduced. The temperature of the intermediate composition is desirably lowered to 180° C. or less, or to 175° C. or less, or to 170° C. or less, or to 165° C. or less. The temperature is lowered in order to prepare for the second stage of the esterification process. If desired, a vacuum can be applied during the temperature reduction and continued during the second stage. The vacuum can be applied starting at the times noted above during the first stage, or if a vacuum is not applied during the first stage, vacuum can be started at any time during the temperature reduction, or can be started when the polycarboxylic anhydride is fed, which starts the second stage. Any of the vacuum values noted above are suitable for applying in the second stage step b).

For example, in the first stage, the reaction can proceed in the reactor at atmospheric to 40 psig, and the reaction can proceed in the second stage b) under a vacuum during at least a portion of the residence time in the second stage b) to further build up the molecular weight of the curable polyester resin. Alternatively, in the first stage, the reaction can proceed in the reactor under an applied vacuum, desirably when at least 50% or at least 70% of the residence time in stage (a) has elapsed, and the reaction can proceed in the second stage b) with or without applied vacuum.

In the second stage, the polycarboxylic anhydride (b)(ii) is added to the reaction mixture of stage (a) to cause the carboxyl groups on the anhydride molecule to react with hydroxyl groups on the intermediate polyester. The anhydride is reacted onto the polyester in the reaction mixture at an elevated temperature of from 140° C. to 180° C.

Additives can be added in the first or second stages to enhance the performance properties of the curable polyester polymer. For example, crystallization aids, impact modifiers, surface lubricants, denesting agents, stabilizers, antioxidants, ultraviolet light absorbing agents, metal deactivators, colorants, nucleating agents, acetaldehyde lowering compounds, reheat rate enhancing aids such as elemental antimony or reduced antimony or reducing agents to form such species in situ, silicon carbide, carbon black, graphite, activated carbon, black iron oxide, red iron oxide and the like, sticky bottle additives such as talc, and fillers and the like can be included. All of these additives and many others and their use are well known in the art and do not require extensive discussion. Any of these compounds can be used in the present composition.

There is also provided a solvent containing (as distinguished from an aqueous based coating) coating composition, comprising:
  a) the curable polyester resin of the present invention,
  b) a crosslinker comprising an amino resin, phenolic resin, isocyanate resin, and epoxy resin, and
  c) an organic solvent.

Suitable organic solvents for the solvent-based coating composition include xylene, ketones (for example, methyl amyl ketone), 2-butoxyethanol, ethyl-3-ethoxypropionate, toluene, butanol, cyclopentanone, cyclohexanone, ethyl acetate, butyl acetate, and other volatile inert solvents typically used in industrial baking (i.e., thermosetting) enamels, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate (available commercially from Eastman Chemical Company under the trademark TEXANOL™), or combinations thereof. The coating composition also may comprise reactive solvents such as, for example, diallyl phthalate, SANTOLINK™ XI-100 polyglycidyl allyl ether (available from Cytec), and others as described, for example, in U.S. Pat. Nos. 5,349,026 and 5,371,148.

The amount of solvent (other than water) is desirably at least 20 wt. %, or at least 25 wt. %, or at least 30 wt. %, or at least 35 wt. %, or at least 40 wt. %, or at least 45 wt. %, or at least 50 wt. %, or at least 55 wt. % based on the weight of the solvent containing coating composition. Additionally or in the alternative, the amount of organic solvent can be up to 85 wt % based on the weight of the coating composition. Solvent containing coating compositions desirably contain 10 wt. % or less, or 8 wt % or less, or 5 wt. % or less, or 3 wt. % or less water, based on the weight of the coating composition.

The solvent containing composition is desirably a solution in which the curable polyester is dissolved or solubilized in the solvent. While other solids can be present in the solvent containing composition (and typically are in a fully formulated or pigmented coating composition), the solvent containing composition desirably has less than 3 wt. % curable polyester resin as solid particles, or less than 1 wt. % curable polyester resin as solid particles, or not more than 0.5 wt. % polyester resin as solid particles, based on the total weight of the curable polyester (a).

There is further provided an aqueous dispersion, comprising
  a) a curable polyester resin of the present invention,
  b) a neutralizing agent, and
  c) water.

The amount of water is desirably at least 20 wt. %, or at least 25 wt %, or at least 30 wt %, or at least 35 wt %, or at least 40 wt. %, or at least 45 wt %, or at least 50 wt %, or at least 55 wt %, or at least 60 wt. % based on the weight of the aqueous dispersion.

The neutralizing agent may be an amine or an inorganic base. Typical amines include ammonia, trimethylamine, diethylamine, monoethanolamine, monoisopropanolamine, morpholine, ethanolamine, diethanolamine, triethanolamine, N,N-dimethylethanolamine, N, N-diethylethanolamine, N-methyldiethanolamine and the like.

Typical inorganic bases include bases derived from alkali metals and alkaline earth metals such as, for example, sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate.

The aqueous dispersion of this invention may and desirably further comprise an organic co-solvent. Suitable co-solvents include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents. If an organic co-solvent is used, the amount is desirably 40 wt. % or less, or 30 wt. % or less, or 15 wt. % or less, or 10 wt. % or 5 wt. % less based on the weight of the aqueous composition, and at least 1 wt %, or at least 3 wt. % based on the weight of the aqueous composition.

Aqueous dispersions of the polyesters of the present invention are typically prepared by dispersing the curable polyester resins with water in the presence of organic co-solvent(s) (e.g. at least 1 or 3 wt. % and up to 15 wt. % based on the weight of the polyester polymers), at a temperature ranging from about 60 to about 95° C. under ambient pressure. The dispersing process may be carried out either by gradually adding the resin to the heated mixture of water, the neutralizing agent, and the co-solvent(s) or by gradually adding water and the neutralizing agent to the heated mixture of the resin and the co-solvent(s). The former method is preferred for resins with a high Tg (e.g. >60° C.), which can be pulverized, for example, by using a blender and subsequently added to the heated water and the neutralizing agent. For resins with a lower Tg, it is preferred to add water and the neutralizing agent to the heated resin mixture containing the co-solvent. After the completion of adding either resin or water, the stirring is allowed to continue until a homogeneous dispersion is obtained. The process typically takes one or several hours. It is intended for this terminology to include conditions where the polyester is dissolved to form a true solution as well as those where the polyester is dispersed within the aqueous medium. Often, due to the statistical nature of polyester compositions, it is possible to have a soluble fraction and a dispersed fraction when a single polyester sample is placed in an aqueous medium.

Desirably, the dispersion contains up to 80 wt. %, or up to 60 wt. %, or up to 50 wt. %, or up to 40 wt. % curable polyester resin. Suitable ranges of curable polyester resin in wt. % based on the weight of the dispersion include 3-80, or 5-80, or 10-80, or 5-80, or 10-80, or 15-80, or 20-80, or 25-80, or 30-80, or 3-60, or 5-60, or 10-60, or 5-60, or 10-60, or 15-60, or 20-60, or 25-60, or 30-60, or 3-50, or 5-50, or 10-50, or 5-50, or 10-50, or 15-50, or 20-50, or 25-50, or 30-50, or 3-45, or 5-45, or 10-45, or 5-45, or 10-45, or 15-45, or 20-45, or 25-45, or 30-45.

As a further aspect, this invention provides a curable waterborne coating composition, comprising:
a) the polyester of the present invention having acid number about 50 to about 120 mg KOH/g,
b) a neutralizing agent,
c) water, and
d) a crosslinker comprising an amino resin, phenolic resin, isocyanate resin, and/or an epoxy resin.

Curable polyester resins having glass transition temperature (Tg) greater than about 50° C. are suitable for powder coating application. The polyester of the present invention comprises TACD, which is capable of providing higher Tg.

Thus, there is further provided a curable powder coating composition comprising
a) a curable polyester of the invention having a Tg greater than about 50° C. and
b) a crosslinker selected comprising an amino resin, blocked isocyanate resin, phenolic resins, epoxy resin, and/or an epoxidized phenolic resin.

Suitable crosslinkers for the curable polyester of the invention are described herein. The amino resin crosslinker (or cross-linking agent) can be a melamine-formaldehyde type cross-linking agent, i.e., a cross-linking agent having a plurality of —N(CH$_2$OR$^3$)$_2$ functional groups, wherein R$^3$ is C$_1$-C$_4$ alkyl, preferably methyl. The amino cross-linking agent may also be a modified melamine-formaldehyde type resin such as toluene sulfonamide modified melamine-formaldehyde resins, and the like.

In general, the amino cross-linking agent may be selected from compounds of the following formulae, wherein R$^3$ is independently C$_1$-C$_4$ alkyl:

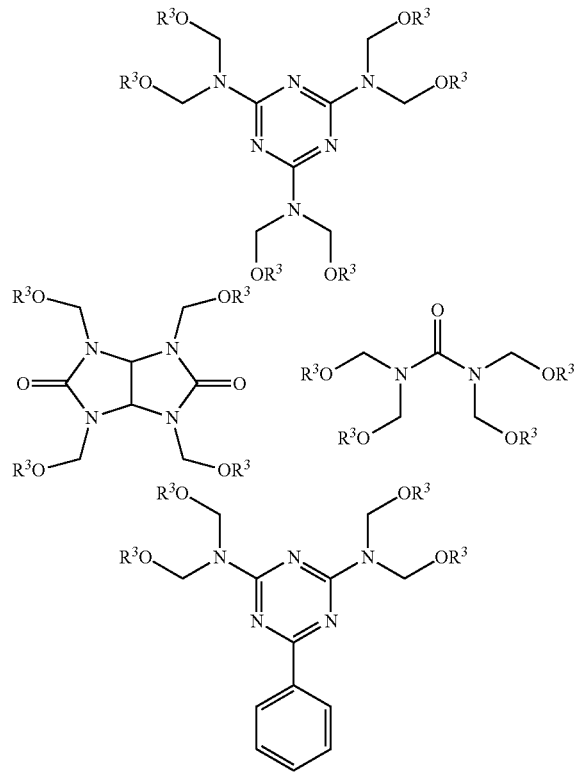

The amino containing cross-linking agents are desirably hexamethoxymethylmelamine, tetramethoxymethylbenzoguanamine, tetramethoxymethylurea, mixed butoxyl/methoxy substituted melamines, and the like. Alternatively, a toluene sulfonamide methylated melaminformaldehyde resin powder may be utilized as a cross-linking agent.

The crosslinking agent may also be blocked or non-blocked isocyanate type. Examples of suitable isocyanate crosslinking agents include, but are not limited to, 1,6-hexamethylene diisocyanate, methylene bis(4-cyclohexyl isocyanate), isophorone diisocyanate, 2,4-toluene diisocyanate, and Bayhydur® 302 (BAYER MaterialScience), The crosslinking agent can be a phenolic resin type. Examples of suitable phenolic crosslinking agents include the condensation products of phenols with aldehydes such as formaldehyde and acetaldehyde. Various phenols can be used such as phenol, cresol, p-alkylphenol, p-phenylphenol, and resorcinol. The phenolic resin may be resole or novolac type. Resole type is desirable. Examples of suitable commercial phenolic resins include PHENODUR® PR 516/60B, PHENODUR® PR 371170B (based on unsubstituted phenol and formaldehyde), and PHENODUR® PR 612180B available from Annex: those with DUREZ® or VARCUM® trade names available from Durex Corp.; and those with Bakelite® trade name available from MOMENTIVE.

Desirably, the resole type phenolic crosslinking agent contains the residues of unsubstituted phenol or meta substituted phenol such as, for example, m-cresol or m-alkylphenol. The present inventors have discovered such phenolic crosslinkers are capable of providing improved curing with the polyesters of this invention, Thus, the preferred phenolic crosslinking agents for this invention are resole type phenolic resins containing at least 50 wt. % or at least 60 wt. % or at least 70 wt. % or at least 80 wt. % or at least 90 wt. % of the residues of unsubstituted phenol and/or meta-substituted phenol, based on the total phenolic residues of the crosslinker resin.

Additionally, the present inventors have surprisingly found that when a combination of resole phenolic resin and amino resin is used for curing with the polyester of the invention, the resulting cured coating films exhibit much less color than those with only phenolic resin as the crosslinker. Thus, there is further provided a crosslinking system comprising a resole phenolic resin and an amino resin. Desirably, the resole resin is used at a higher weight ratio than the amino resin. Desirably, the cross-linker composition contains greater than 50 wt. % or greater than 60 wt. % or greater than 70 wt. % or greater than 80 wt. % or greater than 90 wt. % resole phenolic resin, based on the weight of all cross-linker compounds.

The crosslinking agent can be an epoxidized phenolic resin type. An example is the reaction product of epichlorohydrin and phenol-formaldehyde novolac such as D.E.N.-431, -438, -439, or D.E.R. 354 available from Dow Chemical Company.

In the case of thermosetting powder coating compositions, the cross-linking agents can be cross-linking compounds with epoxy groups such as triglycidyl isocyanurate. Desirable epoxy functional compounds generally have a molecular weight of about 300 to about 4000, and have approximately 0.05 to about 0.99 epoxy groups per 100 g of resin (i.e., 100-2000 weight per epoxy (WPE)). Such resins are widely known and are commercially-available under EPON™ trade name available from MOMENTIVE.

The compositions of the invention can also include one or more cross-linking catalysts. Representative crosslinking catalysts include from carboxylic acids, sulfonic acids, tertiary amines, tertiary phosphines, tin compounds, or combinations of these compounds. Some specific examples of crosslinking catalysts include p-toluenesulfonic acid, the NACURE™ 155, 5076, and 1051 catalysts sold by King Industries, BYK 450, 470, available from BYK-Chemie U.S.A., methyl tolyl sulfonimide, p-toluenesulfonic acid, dodecylbenzene sulfonic acid, dinonylnaphthalene sulfonic acid, and dinonylnaphthalene disulfonic acid, benzoic acid, triphenylphosphine, dibutyl-tindilaurate, and dibutyltindiacetate.

The crosslinking catalyst can depend on the type of crosslinker that is used in the coating composition. For example, the crosslinker can comprise an epoxide, and the crosslinking catalyst can comprise at least one compound chosen from p-toluenesulfonic acid, benzoic acid, tertiary amines, and triphenylphosphine. In another example, the crosslinker can comprise a melamine or "amino" crosslinker and the crosslinking catalyst can comprise p-toluenesulfonic acid, unblocked and blocked dodecylbenzene sulfonic (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially under trademarks such as, for example, NACURE™ 155, 5076, 1051, and 5225 (available from King Industries), BYK-CATALYSTS™ (available from BYK-Chemie USA), and CYCAT™ catalysts (available from Cytec Surface Specialties). The coating compositions of the invention can comprise one or more isocyanate crosslinking catalysts such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212™ non-tin catalysts (available from King Industries), and tertiary amines.

The compositions of the invention can also contain one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

The coating composition may also comprise at least one pigment. Typically, the pigment is present in an amount of about 20 to about 60 weight percent, based on the total weight of the composition. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15,15:1,15:2,15:3,15:4 (copper phthalocyanines); CI Pigment Red 49:1 and CI Pigment Red 57:1. Colorants such as, for example, phthalocyanine blue, molybdate orange, or carbon black also may be added to the coating composition. For example, the solventborne, thermosetting coating formulations can contain titanium dioxide as the pigment.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., about 0.1 to about 4 mils, or 0.5 to 3, or 0.5 to 2, or 0.5 to 1 mils of wet coating onto a substrate. The coating can be cured at ambient (room) temperature or heated in a forced air oven to a temperature of about 50° C. to about 175° C., for a time period that typically ranges about 5 to about 90 minutes and allowed to cool. Further examples of typical application and curing methods can be found in U.S. Pat. Nos. 4,737,551 and 4,698,391 and 3,345,313.

The invention is further illustrated by the following examples.

EXAMPLES

Example 1

Synthesis of Carboxyl-Functional TMCD-Based Polyester Using CHDA and IPA as the Diacids with AN:OH Ratio of at Least 0.5:1 (Resin 1)

A 500 mL, three-neck, round-bottom flask was equipped with a mechanical stirrer, a heated partial condenser, a Dean-Stark trap, and a water condenser. To the flask were charged 2,2,4,4-tetramethyl-13-cyclobutanediol (TMCD) (62.5 g); trimethylolpropane (TMP) (5.95 g); 1,4-cyclohexanedicarboxylic acid (CHDA) (34.4 g), isophthalic acid (IPA) (33.2 g), and the acid catalyst, Fascat-4100 (Arkema Inc.) (0.20 g). The reaction was allowed to react under nitrogen at 180° C. for 20 min., at 200° C. for 60 min., at 220° C. for 120 min., and at 230° C. for about 2 hours to yield a clear, viscous mixture. A total of 12.5 mL of distillate was collected in the Dean-Stark trap.

The reaction mixture was then allowed to cool to 150° C., followed by the addition of trimellitic anhydride (TMA) (14.06 g). After the addition of TMA, the temperature was increased to 170° C. and the mixture allowed to react for about 1.5 hours. The resulting mixture was allowed to cool to room temperature and subsequently placed in dry ice to chill for ease to break and collect the solid product (133.03 g).

Using the same method as above, resins 3, 5, and 6 were synthesized, in which no vacuum was used in the process. For resins 2 and 4, vacuum was applied at the end of the first stage reaction before addition of TMA in order to build up resin molecular weights. In the process, the reactor was reassembled to be connected to a glass vacuum tube for further reaction under reduced pressures. The reaction was allowed to continue at 230° C. under vacuum (gradually reduced to <1 mmHg) for one hour. After that, the reactor was assembled for reaction with TMA as described previously.

The relative amounts and the results are reported in Tables 4 and 5.

TABLE 4

Synthesized Carboxyl Functional TMCD-Based Polyesters Using CHDA and IPA with R-Value Variation

| | Resin Composition as Charged | | | | total eq. | Post React TMA TMA/Total |
|---|---|---|---|---|---|---|
| | Equivalent (eq.) Ratio Based on | | Eq. Ratio Based | | of OH/total | Diacids (mole %) |
| | Total Alcohols (%) | | on Total Diacids (%) | | eq. of COON | Vacuum before |
| | TMCD | TMP | CHDA | IPA | (R value) | TMA | TMA |
| Resin 1 | 86.7 | 13.3 | 50 | 50 | 1.25 | N | 18.29 |
| Resin 2 | 86.7 | 13.3 | 50 | 50 | 1.25 | Y | 18.29 |
| Resin 3 | 86.7 | 13.3 | 50 | 50 | 1.30 | N | 18.29 |
| Resin 4 | 86.7 | 13.3 | 50 | 50 | 1.30 | Y | 18.29 |
| Resin 5 | 86.7 | 13.3 | 50 | 50 | 1.35 | N | 18.29 |
| Resin 6 | 86.7 | 13.3 | 50 | 50 | 1.40 | N | 18.29 |

TABLE 5

Analysis of Synthesized Carboxyl Functional TMCD-Based Polyesters Using CHDA and IPA with R-Value Variation

| | Resin Properties | | | Acid Number | OH Number | |
|---|---|---|---|---|---|---|
| | Tg, C. | Mn | Mw | Analyzed | Analyzed | AN:OH |
| Resin 1 | 90.7 | 1185 | 4214 | 73 | 37 | 1.97 |
| Resin 2 | 89.4 | 2029 | 7843 | 73 | 17 | 4.3 |
| Resin 3 | 96.4 | 1299 | 5639 | 77 | 34 | 2.26 |
| Resin 4 | 100.7 | 2173 | 9721 | 68 | 26 | 2.6 |
| Resin 5 | 95.6 | 1869 | 11379 | 78 | 28 | 2.78 |
| Resin 6 | 89.6 | 1659 | 5470 | 58 | 97 | 0.59 |

Example 3

Synthesis of Carboxyl-Functional TMCD-Based Polyester Using IPA and AD as the Diacids with AN:OH at Least 0.5:1 (Resin 8)

A 500 mL, three-neck, round-bottom flask was equipped with a mechanical stirrer, a heated partial condenser, a Dean-Stark trap, and a water condenser. To the flask were charged 2,2,4,4-tetramethyl-13-cyclobutanediol (TMCD) (62.5 g); trimethylolpropane (TMP) (5.95 g); isophthalic acid (IPA) (46.5 g), adipic acid (17.5 g), and the acid catalyst, Fascat-4100 (Arkema Inc.) (0.20 g). The reaction was allowed to react under nitrogen at 180° C. for 30 min., at 200° C. for 75 min., at 220° C. for 90 min., and at 230° C. for about 2 hours to yield a clear, viscous mixture. A total of 7.5 mL of distillate was collected in the Dean-Stark trap.

The reactor was then reassembled to be connected to a glass vacuum tube for further reaction under reduced pressures. The reaction was allowed to continue at 230° C. under vacuum (gradually reduced to <1 mmHg) for one hour. After that, vacuum was removed and the reactor assembled back as before. The reaction mixture was then allowed to cool to 150° C., followed by the addition of trimellitic anhydride (TMA) (14.06 g). After the addition of TMA, the temperature was increased to 170° C. and the mixture allowed to react for about 1.5 hours. The resulting mixture was allowed to cool to room temperature and subsequently placed in dry ice to chill for ease to break and collect the solid product (126.43 g). Using the same method, Resins 7-12 were prepared with or without the application of vacuum.

TABLE 6

Synthesized Carboxyl Functional TMCD-Based Polyesters Using IPA and AD with R-Value Variation

| | Resin Composition as Charged | | | | | | Post React TMA TMA/Total Diacids (mole %) |
|---|---|---|---|---|---|---|---|
| | Eq. Ratio Based on Total Alcohols (%) | | Eq. Ratio Based on Total Diacids (%) | | OH/COOH | Vacuum before | |
| | TMCD | TMP | IPA | AD | (R value) | TMA | TMA |
| Resin 7 | 86.7 | 13.3 | 70 | 30 | 1.25 | N | 18.29 |
| Resin 8 | 86.7 | 13.3 | 70 | 30 | 1.25 | Y | 18.29 |
| Resin 9 | 86.7 | 13.3 | 70 | 30 | 1.30 | N | 18.29 |
| Resin 10 | 86.7 | 13.3 | 70 | 30 | 1.30 | Y | 18.29 |
| Resin 11 | 86.7 | 13.3 | 70 | 30 | 1.35 | N | 18.29 |
| Resin 12 | 86.7 | 13.3 | 70 | 30 | 1.40 | N | 18.29 |

TABLE 7

Analysis of Synthesized Carboxyl Functional TMCD-Based Polyesters Using IPA and AD with R-Value Variation

| | Resin Properties | | | Acid Number Analyzed | OH Number Analyzed | AN/OH |
|---|---|---|---|---|---|---|
| | Tg, C. | Mn | Mw | | | |
| Resin 7 | 80.4 | 1712 | 7481 | 79 | 30 | 2.66 |
| Resin 8 | 86.4 | 2278 | 15130 | 68 | 17 | 4 |
| Resin 9 | 81.2 | 1794 | 7436 | 68 | 32 | 2.13 |
| Resin 10 | 82.9 | 2074 | 10565 | 66 | 22 | 3 |
| Resin 11 | 81.8 | 1892 | 9233 | 61 | 36 | 1.69 |
| Resin 12 | 62.6 | 1293 | 4031 | 58 | 90 | 0.64 |

Example 3

Synthesis of Carboxyl-Functional TMCD-Based Polyester Using CHDA and AD as the Diacids with an AN:OH of at Least 0.5:1 (Resin 15)

A 500 mL, three-neck, round-bottom flask was equipped with a mechanical stirrer, a heated partial condenser, a Dean-Stark trap, and a water condenser. To the flask were charged 2,2,4,4-tetramethyl-13-cyclobutanediol (TMCD) (65.0 g); trimethylolpropane (TMP) (6.19 g); 1,4-cyclohexanedicarboxylic acid (CHDA) (48.2 g), adipic acid (AD) (17.5 g), and the acid catalyst, Fascat-4100 (Arkema Inc.) (0.21 g). The reaction was allowed to react under nitrogen at 180° C. for 50 min., at 200° C. for 60 min., at 220° C. for 80 min., and at 230° C. for about 2 hours to yield a clear, viscous mixture. A total of 12 mL of distillate was collected in the Dean-Stark trap.

The reaction mixture was then allowed to cool to 150° C., followed by the addition of trimellitic anhydride (TMA) (14.06 g). After the addition of TMA, the temperature was increased to 170° C. and the mixture allowed to react for about 1.5 hours. The resulting mixture was allowed to cool to room temperature and subsequently placed in dry ice to chill for ease to break and collect the solid product (129.7 g). Using the same method, Resins 13-18 were prepared with or without the application of vacuum.

TABLE 8

Synthesized Carboxyl Functional TMCD-Based Polyesters Using CHDA and AD with R-Value Variation

| | Resin Composition as Charged | | | | | | Post React TMA TMA/Diacids (mole %) |
|---|---|---|---|---|---|---|---|
| | Eq. Ratio Based on Total Alcohols (%) | | Eq. Ratio Based on Total Diacids (%) | | OH/COOH | Vacuum before | |
| | TMCD | TMP | CHDA | AD | (R value) | TMA | TMA |
| Resin 13 | 86.7 | 13.3 | 70 | 30 | 1.25 | N | 18.29 |
| Resin 14 | 86.7 | 13.3 | 70 | 30 | 1.25 | Y | 18.29 |
| Resin 15 | 86.7 | 13.3 | 70 | 30 | 1.30 | N | 18.29 |
| Resin 16 | 86.7 | 13.3 | 70 | 30 | 1.30 | Y | 18.29 |
| Resin 17 | 86.7 | 13.3 | 70 | 30 | 1.35 | N | 18.29 |
| Resin 18 | 86.7 | 13.3 | 70 | 30 | 1.40 | N | 18.29 |

TABLE 9

Analysis of Synthesized Carboxyl Functional TMCD-Based Polyesters Using CHDA and AD with R-Value Variation

| | Resin Properties | | | Acid Number Analyzed | OH Number Analyzed | AN:OH |
|---|---|---|---|---|---|---|
| | Tg, C. | Mn | Mw | | | |
| Resin 13 | 59.0 | 2115 | 20605 | 84 | 31 | 2.71 |
| Resin 14 | 56.0 | 1621 | 21907 | 77 | 11 | 7 |
| Resin 15 | 53.3 | 1648 | 10418 | 72 | 25 | 2.88 |
| Resin 16 | 55.9 | 1155 | 27532 | 77 | 15 | 5.13 |
| Resin 17 | 52.9 | 1920 | 9412 | 64 | 32 | 2 |
| Resin 18 | 46.5 | 1612 | 5221 | 65 | 48 | 1.35 |

Example 4

Preparation of Aqueous Dispersions of Various Polyesters

Below is a typical procedure for the preparation of aqueous dispersions of the polyesters synthesized.

A Parr reactor was used for the preparation of the resin dispersion. Resin 1 was first ground to about 6 mm pellets. The resin pellets (42.0 g) were then placed in the reaction vessel along with distilled water (78.0 g) and dimethylethanolamine (DMEA) (7.36 g) for neutralization. The amount of DMEA added for neutralization (100%) is calculated according to the measured acid number of the resin. The Parr reactor was then assembled and heated first to 95° C. and then to 110° C. The stirring was allowed to continue at 110° C. for 45 min. and subsequently allowed to cool to 50° C. The resulting dispersion was filtered with a standard paint filter and collected.

Aqueous dispersion (35% solids) was prepared from each resin. Particle size and pH were analyzed for each dispersion. Particle size was measured using Nanotrac (Microtrac Inc.). The results are listed in Table 10. The particle size, MV, represents the mean diameter in nanometer (nm) of the volume distribution.

TABLE 10

Particle Size and pH of Various TMCD Polyester Dispersions

| | Dispersion (35% Solids) | |
|---|---|---|
| | Particle size, MV (nm) | pH |
| Resin 1 | 11.29 | 9.30 |
| Resin 2 | 12.80 | 7.15 |
| Resin 3 | 10.95 | 7.96 |
| Resin 4 | 13.20 | 6.95 |
| Resin 5 | 13.12 | 8.57 |
| Resin 6 | 14.08 | 7.88 |
| Resin 7 | 13.03 | 7.80 |
| Resin 8 | 14.74 | 7.08 |
| Resin 9 | 12.49 | 8.74 |
| Resin 10 | 16.89 | 6.79 |
| Resin 11 | 13.31 | 7.26 |
| Resin 12 | 19.86 | 7.34 |
| Resin 13 | 16.42 | 7.60 |
| Resin 14 | 32.70 | 6.61 |
| Resin 15 | 15.77 | 7.92 |
| Resin 16 | 55.50 | 6.15 |
| Resin 17 | 16.55 | 7.92 |
| Resin 18 | 17.91 | 7.52 |

Example 5

Synthesis of Carboxyl-Functional TMCD-Based Curable Polyester Resin with AN:OH of at Least 0.5:1 (Resin 25)

A 500 mL, three-neck, round-bottom flask was equipped with a mechanical stirrer, a heated partial condenser, a Dean-Stark trap, and a water condenser. To the flask were charged neopentyl glycol (NPG) (9.7 g); 2,2,4,4-tetramethyl-13-cyclobutanediol (TMCD) (56.5 g); trimethylolpropane (TMP) (6.66 g); 1,4-cyclohexanedicarboxylic acid (CHDA) (68.9 g), and the acid catalyst, Fascat-4100 (Arkema Inc.) (0.21 g). The reaction was allowed to react under nitrogen at 180° C. for 30 min., at 200° C. for 60 min., at 220° C. for 90 min., and at 230° C. for about 2 hours to yield a clear, viscous mixture. A total of 11.0 mL of distillate was collected in the Dean-Stark trap.

The reaction mixture was then allowed to cool to 150° C., followed by the addition of trimellitic anhydride (TMA) (14.95 g). After the addition of TMA, the temperature was increased to 170° C. and the mixture allowed to react for about 2 hours. The resulting mixture was allowed to cool to room temperature and subsequently placed in dry ice to chill for ease to break and collect the solid product (134.81 g).

Using the same method as above, the following TMCD polyesters were synthesized with variation in branching level and using CHDA as the diacid (Table 11), variation in branching level and using CHDA and AD as the diacids (Table 13), variation in TMCD level and having fixed branching level (Table 15), and variation in CHDA and AD and having fixed branching level (Table 17). The analysis of each follows in the subsequent Table.

TABLE 11

Synthesized Carboxyl Functional TMCD Polyesters with Variation in Branching Level and Using CHDA as the Diacid

| | Resin Composition as Charged | | | | Post React |
|---|---|---|---|---|---|
| | Eq. Ratio Based on Total Alcohols (%) | | Eq. Ratio Based on Total Diacids (%) | OH/COON (R value) | TMA TMA/Diacids (mole %) |
| | TMCD | TMP | CHDA | | TMA |
| Resin 19 | 86.7 | 13.3 | 100.0 | 1.40 | 18.33 |
| Resin 20 | 93.4 | 6.7 | 100.0 | 1.40 | 18.33 |
| Resin 21 | 96.7 | 3.3 | 100.0 | 1.40 | 18.33 |

TABLE 12

Analysis of Synthesized Carboxyl Functional Polyesters with Variation in Branching Level and Using CHDA as the Diacid

| | Resin Properties | | | Acid Number | OH Number | AN:OH |
|---|---|---|---|---|---|---|
| | Tg, C. | Mn | Mw | Analyzed | Analyzed | Ratio |
| Resin 19 | 75.2 | 1949 | 6126 | 66.0 | 47.0 | 1.4 |
| Resin 20 | 70.6 | 1748 | 3618 | 68.0 | 45.0 | 1.51 |
| Resin 21 | 77.0 | 1806 | 3564 | 68.0 | 38.0 | 1.79 |

TABLE 13

Synthesized Carboxyl Functional TMCD Polyesters with Variation in Branching Level and Using CHDA and AD as the Diacids

| | Resin Composition as Charged | | | | | Post React |
|---|---|---|---|---|---|---|
| | Eq. Ratio Based on Total Alcohols (%) | | Eq. Ratio Based on Total Diacids (%) | | OH/ COOH (R value) | TMA TMA/ Diacids (mole %) |
| | TMCD | TMP | CHDA | AD | | TMA |
| Resin 22 | 93.3 | 6.7 | 50 | 50 | 1.40 | 18.33 |
| Resin 23 | 86.7 | 13.3 | 50 | 50 | 1.40 | 18.33 |
| Resin 24 | 80.0 | 20.0 | 50 | 50 | 1.40 | 18.33 |

TABLE 14

Analysis of Synthesized Carboxyl Functional TMCD-Based Polyesters with Variation in Branching Level and Using CHDA and AD as the Diacids

| | Resin Properties | | | Acid Number | OH Number | AN:OH |
|---|---|---|---|---|---|---|
| | Tg, C. | Mn | Mw | Analyzed | Analyzed | Ratio |
| Resin 22 | 34.6 | 1720 | 4176 | 60 | 55 | 1.09 |
| Resin 23 | 39.0 | 1779 | 6651 | 66 | 54 | 1.22 |
| Resin 24 | 37.6 | 1752 | 12871 | 63 | 46 | 1.37 |

TABLE 15

Synthesized Carboxyl Functional TMCD Polyesters with Variation in TMCD Level and Having Fixed Branching Level

| | Resin Composition as Charged | | | | | Post React |
|---|---|---|---|---|---|---|
| | Eq. Ratio Based on Total Alcohols (%) | | | Eq. Ratio Based on Total Diacids (%) | OH/ COOH | TMA TMA/ Diacids |
| | TMCD | TMP | NPG | CHDA | (R value) | TMA |
| Resin 25 | 70.0 | 13.3 | 16.7 | 100.0 | 1.40 | 18.33 |
| Resin 26 | 80.0 | 13.3 | 6.7 | 100.0 | 1.40 | 18.33 |
| Resin 27 | 86.7 | 13.3 | 0.0 | 100.0 | 1.40 | 18.33 |

TABLE 16

Analysis of Synthesized Carboxyl Functional TMCD-Based Polyesters with Variation in CHDA and AD and Having Fixed Branching Level

| | Resin Properties | | | Acid Number Analyzed | OH Number Analyzed | AN:OH Ratio |
|---|---|---|---|---|---|---|
| | Tg, C. | Mn | Mw | | | |
| Resin 28 | 53.8 | 1490 | 4301 | 63 | 40 | 1.5 |
| Resin 29 | 41.7 | 1556 | 5640 | 63 | 51 | 1.23 |
| Resin 30 | 39.0 | 1779 | 6651 | 66 | 54 | 1.22 |

TABLE 17

Synthesized Carboxyl Functional TMCD Polyesters with Variation in CHDA and AD and Having Fixed Branching Level

| | Resin Composition as Charged | | | | | Post React |
|---|---|---|---|---|---|---|
| | Eq. Ratio Based on Total Alcohols (%) | | Eq. Ratio Based on Total Diacids (%) | | OH/COOH | TMA TMA/Diacids |
| | TMCD | TMP | CHDA | AD | (R value) | TMA |
| Resin 28 | 86.7 | 13.3 | 70 | 30 | 1.40 | 18.33 |
| Resin 29 | 86.7 | 13.3 | 60 | 40 | 1.40 | 18.33 |
| Resin 30 | 86.7 | 13.3 | 50 | 50 | 1.40 | 18.33 |

TABLE 18

Analysis of Synthesized Carboxyl Functional TMCD-Based Polyesters with Variation in TMCD Level and Having Fixed Branching Level

| | Resin Properties | | | Acid Number Analyzed | OH Number Analyzed | AN:OH Ratio |
|---|---|---|---|---|---|---|
| | Tg, C. | Mn | Mw | | | |
| Resin 25 | 55.0 | 1579 | 4570 | 63.0 | 63.0 | 1 |
| Resin 26 | 68.7 | 1844 | 5498 | 62.0 | 48.0 | 1.29 |
| Resin 27 | 75.2 | 1949 | 6126 | 66.0 | 47.0 | 1.4 |

Example 6

Preparation of Aqueous Dispersions of Various Polyesters

Below is a typical procedure for the preparation of aqueous dispersions of the polyesters synthesized. Polyester was first ground to pellets (about 6 mm). An amount of 50 g polyester was used for making dispersion with about 35% solids. Water (92.86 g) was charged to a 500 mL three-necked round bottom flask and heated to 80° C., followed by the addition of ammonium hydroxide solution (6.00 g; 28-30% ammonia in water) as the neutralizing agent. To the stirred mixture was added polyester (50.0 g) gradually (scoop by scoop). The addition was complete in about 30 minutes. A defoamer (about 6 drops) (BYK-024) and additional NH$_4$OH (0.50 g) were then added. The stirring was allowed to continue at 80° C. for one hour and subsequently allowed to cool to room temperature. The resulting dispersion was filtered and collected.

Aqueous dispersions (35% solids) were prepared from each resin. Particle size and pH were analyzed for each dispersion. Particle size was measured using Nanotrac (Microtrac Inc.). The results are listed in Table 19. The particle size, MV, represents the mean diameter in nanometer (nm) of the volume distribution.

TABLE 19

Particle Size and pH of Various TMCD Polyester Dispersions

| | Dispersion | |
|---|---|---|
| | Particle size, MV (nm) | pH (ammonium neutralized) |
| Resin 19 | 16.6 | 7.43 |
| Resin 20 | 14.4 | 7.38 |
| Resin 21 | 13.0 | 7.39 |
| Resin 22 | 36.8 | 8.06 |
| Resin 23 | 17.8 | 7.21 |
| Resin 24 | 42.6 | 7.04 |
| Resin 25 | 18.1 | 8.80 |
| Resin 26 | 16.7 | 8.20 |
| Resin 27 | 16.6 | 7.43 |
| Resin 28 | 13.70 | 7.74 |
| Resin 29 | 29.3 | 6.95 |
| Resin 30 | 17.8 | 7.21 |

Example 7

Preparation of Various Solvent-Based Formulations

As listed in Table 20, solvent-based formulations were prepared by using Resins 5, 6, 10, and 14. Polyester solutions (35% solids) were first prepared by dissolving the polyesters in methyl amyl ketone (MAK). Three formulations were then prepared from each polyester by mixing respectively the polyester solution with a phenolic resin (PHENODUR® PR 516/603 or PHENODUR® PR 371/70B) or a combination of phenolic resin and an amino resin (Cymel 303 available from Allnex) in the presence of an acid catalyst, p-toluenesulfonic acid (pTSA).

TABLE 20

Compositions of Various Formulations

| Formulation | Polyester (35% in MAK); grams | Phenolic Resin; grams | Cymel 303 (100%); grams | pTSA (5% in isopropanol); grams | Resin Ratio | Catalyst Ratio |
|---|---|---|---|---|---|---|
| 1 | 10 (Resin 5) | 2.5 (PR516/60B) | | 0.5 | 70/30 | 0.5 phr |

TABLE 20-continued

Compositions of Various Formulations

| Formulation | Polyester (35% in MAK); grams | Phenolic Resin; grams | Cymel 303 (100%); grams | pTSA (5% in isopropanol); grams | Resin Ratio | Catalyst Ratio |
|---|---|---|---|---|---|---|
| 2 | 10 (Resin 5) | 2.14 (PR371/70B) | | 0.5 | 70/30 | 0.5 phr |
| 3 | 10 (Resin 5) | 1.43 (PR371/70B) | 0.5 | 0.5 | 70/20/10 | 0.5 phr |
| 4 | 10 (Resin 6) | 2.5 (PR516/60B) | | 0.5 | 70/30 | 0.5 phr |
| 5 | 10 (Resin 6) | 2.14 (PR371/70B) | | 0.5 | 70/30 | 0.5 phr |
| 6 | 10 (Resin 6) | 1.43 (PR371/70B) | 0.5 | 0.5 | 70/20/10 | 0.5 phr |
| 7 | 10 (Resin 10) | 2.5 (PR516/60B) | | 0.5 | 70/30 | 0.5 phr |
| 8 | 10 (Resin 10) | 2.14 (PR371/70B) | | 0.5 | 70/30 | 0.5 phr |
| 9 | 10 (Resin 10) | 1.43 (PR371/70B) | 0.5 | 0.5 | 70/20/10 | 0.5 phr |
| 10 | 10 (Resin 14) | 2.5 (PR516/60B) | | 0.5 | 70/30 | 0.5 phr |
| 11 | 10 (Resin 14) | 2.14 (PR371/70B) | | 0.5 | 70/30 | 0.5 phr |
| 12 | 10 (Resin 14) | 1.43 (PR371/70B) | 0.5 | 0.5 | 70/20/10 | 0.5 phr |

Example 8

Evaluation of Cured Films by MEK Double Rub Test

Formulations 1-12 prepared in Example 7 were drawn down respectively on cold-rolled steel test panels (ACT 3x9x032 from Advanced Coating Technologies) using a draw-down bar and subsequently baked in an oven at 205° C. for 10 minutes. The thickness of the coating films was about 20 to 25 μm. The degree of crosslinking of the cured films was determined by their solvent resistance using MEK Double Rub Method (ASTM D4752). The results are collected in Table 21. Typically a result of >30 is considered acceptable and >200 is preferred. It was also found that formulations 3, 6, 9, 12, which contained 10% amino crosslinker, Cymel 303, formed cured coatings with much less color as compared to the ones without Cymel 303-slightly yellow vs. gold color by visual appearance to the eye.

TABLE 21

MEK Double Rub Test of the Cured Films from Various Formulations

| Formulation | 1 | 2 | 3 | 4 | 5 | 6 | 7 | 8 | 9 | 10 | 11 | 12 |
|---|---|---|---|---|---|---|---|---|---|---|---|---|
| MEK double rubs (slight or no effect) | 30 | 500 | 500 | 30 | 500 | 500 | 50 | 500 | 500 | 30 | 200 | 400 |

Example 9

Synthesis of Phenolic Resin Based on m-Cresol (m-Cresol/HCHO)

To a round-bottom flask equipped with a water-jacketed condenser were added m-cresol (30.0 g), paraformaldehyde (16.7 g), triethylamine (5.6 g), and toluene (200 mL). The reaction mixture was stirred and allowed to react at 60° C. for 5 hours. After the reaction, the resulting mixture was cooled to room temperature, which was separated into two layers—an oily resin layer and a toluene layer at the top. The resin layer was collected and washed repeatedly with fresh toluene using a rotary evaporator. The resulting viscous resin was dissolved in methyl ethyl ketone and subsequently filtered to remove the insoluble impurities. The solvent was removed under reduced pressure, and the resulting resin was mixed with toluene to further remove the volatiles using the rotary evaporator. A highly viscous, brown-yellow resin was obtained. The yield was 25 g.

Example 10

Synthesis of Phenolic Resin Based on o-Cresol (o-Cresol/HCHO)

To a round-bottom flask equipped with a water-jacketed condenser were added o-cresol (43.2 g), aqueous formaldehyde solution (37 wt. %, 162 g), and NaOH (20 wt. % in water, 15 mL). The reaction mixture was stirred and allowed to react at 60° C. for three days. After the reaction, the resulting mixture was cooled to room temperature, which was separated into two layers—an oily resin layer and a water layer at the top. The resin layer was collected and subsequently dissolved in ethanol. To the resin solution was added dilute aqueous HCl solution. The resin layer was collected and washed repeatedly with ethanol using a rotary evaporator. The resulting resin solid was collected and dried under vacuum at 40-45° C. to yield a yellow powdery product. The yield was 50 g.

Example 11

Synthesis of Phenolic Resin Based on p-Cresol (p-Cresol/HCHO)

To a round-bottom flask equipped with a water-jacketed condenser were added p-cresol (43.2 g), aqueous formaldehyde solution (37 wt. %, 162 g), and NaOH (20 wt. % in water, 15 mL). The reaction mixture was stirred and allowed to react at 60° C. for three days. After the reaction, the resulting mixture was cooled to room temperature and aqueous HCl solution added to yield a precipitate. The resulting resin solid was collected, washed repeated with water, and dried under vacuum at 40-45° C. to yield a yellow powdery product. The yield was 45 g.

Example 12

Preparation of Solvent-Based Formulations Using Various Cresol-Based Phenolic Resins As listed in Table 22, solvent-based formulations were prepared by using Resins 6 and various cresol based phenolic resins, m-Cresol/HCHO, o-Cresol/HCHO, and p-Cresol/HCHO, prepared in Example 9-11. Polyester solutions (35% solids) were first prepared by dissolving the polyester (Resin 6) in methyl amyl ketone (MAK). Three formulations were then prepared by mixing respectively the polyester solution with a phenolic resin (m-Cresol/HCHO, o-Cresol/HCHO, and p-Cresol/HCHO) in the presence of an acid catalyst, p-toluenesuifonic acid (pTSA).

TABLE 22

Compositions of Various Formulations

| Formulation | Polyester (35% in MAK); grams | Phenolic Resin Solution | Phenolic Resin Solution; grams | pTSA (5% in isopropanol); grams | Resin Ratio | Catalyst Ratio |
|---|---|---|---|---|---|---|
| 13 | 10 (Resin 6) | m-Cresol/ HCHO (70% in MAK) | 2.14 | 0.5 | 70/30 | 0.5 phr |
| 14 | 10 (Resin 6) | o-Cresol/ HCHO (50% in MAK) | 3 | 0.5 | 70/30 | 0.5 phr |
| 15 | 10 (Resin 6) | p-Cresol/ HCHO (50% in cyclopentanone) | 3 | 0.5 | 70/30 | 0.5 phr |

Example 13

Evaluation of Cured Films by MEK Double Rub Test

Formulations 13-15 prepared in Example 12 were drawn down respectively on cold-rolled steel test panels (ACT 3x9x032 from Advanced Coating Technologies) using a draw-down bar and subsequently baked in an oven at 205° C. for 10 minutes. The thickness of the coating films was about 20 to 25 µm. The degree of crosslinking of the cured films was determined by their solvent resistance using MEK Double Rub Method (ASTM D4752). The results are collected in Table 23. Typically a result of >30 is considered acceptable and >200 is preferred.

TABLE 23

MEK Double Rub Test of the Cured Films from Various Formulations

| Formulation | 13 | 14 | 15 |
|---|---|---|---|
| MEK double rubs (slight or no effect) | 300 | <20 | <20 |

What we claim is:

1. A composition comprising a curable polyester resin, said polyester resin comprising the residues of:
    a) polyhydroxyl compounds comprising:
        (i) a 2,2,4,4-tetraalkylcyclobutane-1,3-diol (TACD) compound, and
        (ii) a polyhydroxyl compound other than TACD, and
    b) polycarboxyl compounds comprising:
        (i) a polycarboxylic acid compound, a derivative of polycarboxylic acid compound other than (bii), or a combination thereof, and
        (ii) a polycarboxylic anhydride compound;
    wherein said curable polyester resin has an acid number ranging from about 20 to about 120 mg KOH/g, a hydroxyl number ranging from greater than 0 to about 100 mg KOH/g, and an acid number:hydroxyl number ratio (AN:OH) of at least 0.5:1.

2. The composition of claim 1, wherein the TACD compound comprises 2,2,4,4-tetramethylcyclobutane-1,3-diol.

3. The composition of claim 1, wherein the polyhydroxyl compound (a)(ii) comprises 2,2-dimethyl-1,3-propanediol (neopentyl glycol), 1,4-cyclohexanedimethanol, or 1,1,1-trimethylol propane, or mixtures thereof.

4. The composition of claim 1, wherein the polycarboxylic acid (b)(i) comprises isophthalic acid, dimethyl isophthalate, terephthalic acid, dimethyl terephthalate, 1,4-cyclohexanedicarboxylic acid, adipic acid, or mixtures thereof.

5. The composition of claim 1, wherein the polycarboxylic acid (b)(i) comprises:
    a) (isophthalic acid or dimethyl isophthalate) and (1,4-cyclohexanedicarboxylic acid, 1,3-cyclohexanedicarboxylic acid, or mixtures thereof); or
    b) (isophthalic acid or dimethyl isophthalate), and (dodecanedioic acid, sebacic acid, azelaic acid, maleic acid, fumaric acid, succinic acid, adipic acid, glutaric acid, itatonic acid, diglycolic acid; or mixtures thereof); or
    c) isophthalic acid or dimethyl isophthalate; or
    d) (1,4-cyclohexanedicarboxylic acid, 1,3-cyclohexanedicarboxylic acid, or mixtures thereof) and (dodecanedioic acid, sebacic acid, azelaic acid, maleic acid, fumaric acid, succinic acid, adipic acid, glutaric acid, itatonic acid, diglycolic acid, or mixtures thereof), or
    e) 1,4-cyclohexanedicarboxylic acid.

6. The composition of claim 1, wherein terephthalic acid or derivatives thereof are not present as polycarboxylic acids (b).

7. The composition of claim 1, wherein the polycarboxylic anhydride compound (b)(ii) comprises isobutyric anhydride, acetic anhydride, 2-ethyl hexanoic anhydride, phthalic anhydride, maleic anhydride, or trimellitic anhydride, or mixtures thereof.

8. The composition of claim 1, wherein the molar quantity of the TACD compound (ai) exceeds the molar quantity of any other polyhydroxyl compound, based on the total moles of polyhydroxyl compounds (a).

9. The composition of claim 1, wherein the quantity of the TACD compound is more than 50 mole % and up to 90 mole %, based on the total moles of polyhydroxyl compounds (a).

10. The composition of claim 1, wherein the curable polyester resin contains TACD residues in an amount of 25-47 mole %, based on the total moles of all components of the curable polyester resin.

11. The composition of claim 1, wherein the molar quantity of the polycarboxylic anhydride compound (bii) is in a range of 8-30 mole %, based on the total moles of polycarboxylic acid (b).

12. The composition of claim 1, wherein the molar quantity of the polycaroxylic anhydride compound (b)(ii) is in a range of 3-15 mole % based on the total moles of all components of the curable polyester resins.

13. The composition of claim 1, wherein the acid number is in a range from 50 to 120.

14. The composition of claim 1, wherein the hydroxyl number is in a range from 20 to 100.

15. The composition of claim 1, wherein the AN:OH ratio is least 0.8:1 and up to 20:1.

16. The composition of claim 1, wherein the curable polyester resin has an acid number, a hydroxyl number, and an AN:OH ratio that is within the range of any one box designated with an "x" in Table 3:

TABLE 3

| OH# | Acid # | | | | | | | | | |
|---|---|---|---|---|---|---|---|---|---|---|
| | 50-100 | 50-90 | 60-120 | 65-100 | 70-100 | 45-90 | 50-85 | 60-90 | 65-90 | 30-90 |
| 15-90 | | x | x | x | x | | x | x | x | |
| 15-75 | | x | x | x | x | | x | x | x | |
| 20-70 | x | | x | | x | | x | x | | |
| 20-65 | x | | x | | x | | x | x | | |
| 20-60 | x | | x | | x | | x | x | | |
| 20-50 | | | x | | x | | x | x | | |
| 15-45 | x | x | x | x | x | | x | x | x | |
| 10-40 | x | x | x | x | x | x | x | x | x | x |
| 40-100 | | | x | | | | | | | |
| 50-100 | | | x | | | | | | | |
| 60-100 | | | x | | | | | | | |
| AN:OH Ratio | 0.8:1-5:1 | 1.5:1-5:1 | 0.5:1-2:1 | 1:1-6:1 | 0.5:1-4:1 | 1.3:1-6:1 | 2:1-4:1 | 0.5:1-3:1 | 1.5:1-5:1 | 1:1-8:1 |

17. The composition of claim 1, wherein the curable polyester resin has an acid number of 50 to 100 mg KOH/q and a hydroxyl number of 10 to 50 mg KOH/q.

18. The composition of claim 1, wherein the curable polyester resin has a glass transition temperature (Tg) from 40° C. to 85° C.

19. The composition of claim 1, wherein the number average molecular weight (Mn) of the curable polyester resin is within a range of 1,000 to 20,000 q/mole.

20. The composition of claim 1, wherein the Mn of the curable polyester resin is within a range of 1,000 to 2,500 q/mole.

21. The composition of claim 1, wherein the curable polyester resin comprises the residues of:
   a) polyhydroxyl compounds comprising:
      i) 2,2,4,4-tetramethylcyclobutane-1,3-diol in an amount ranging from about 3 to 98 mole %, based on the total moles of polyhydroxyl compounds (a), and
      ii) polyhydroxyl compounds other than 2,2,4,4-tetramethylcyclobutane-1,3-diol comprising
         (1) a diol in an amount ranging from 0 to 95 mole %, based on the total moles of (a), and
         (2) a polyhydroxyl compound having 3 or more hydroxyl groups in an amount ranging from 2 to 20 mole %, based on the total moles of (a), and
   b) polycarboxyl compounds comprising
      i) a polycarboxylic acid, a derivative of polycarboxylic acid compound (other than bii)), or a combination thereof in an amount ranging from 70 to 95 mole %, based on the total moles of (b), and
      ii) a polycarboxylic anhydride in an amount ranging from 5 to 30 mole %, based on the total moles of (b),
   wherein said polyester resin has an acid number ranging from about 30 to about 100 mg KOH/g and a hydroxyl number ranging from 3 to about 80 mg KOH/g.

22. The composition of claim 21, wherein the curable polyester resin comprises the residues of:
   a) polyhydroxyl compounds comprising:
      i) 2,2,4,4-tetramethylcyclobutane-1,3-diol in an amount ranging from about 60 to 97 mole %, based on the total moles of polyhydroxyl compounds (a), and
      ii) polyhydroxyl compounds other than 2,2,4,4-tetramethylcyclobutane-1,3-diol comprising
         (1) a diol in an amount ranging from 0 to 37 mole %, based on the total moles of (a), and
         (2) a polyhydroxyl compound having 3 or more hydroxyl groups in an amount ranging from 3 to 15 mole %, based on the total moles of (a), and
   b) polycarboxyl compounds comprising
      i) a polycarboxylic acid, a derivative of polycarboxylic acid compound (other than bii)), or a combination thereof in an amount ranging from 75 to 90 mole %, based on the total moles of (b), and
      ii) a polycarboxylic anhydride in an amount ranging from 10 to 25 mole %, based on the total moles of (b),
   wherein said polyester resin has an acid number ranging from about 30 to about 100 mg KOH/g and a hydroxyl number ranging from 3 to about 80 mg KOH/g.

23. The composition of claim 22, wherein the AN:OH ratio is at least 0.9:1.

24. The composition of claim 22, wherein the (a)(ii)(1) diol comprises 2,2-dimethyl-1,3-propanediol, 1,3-cyclohexanedimethanol, 1,4-cyclohexanedimethanol, 2-methyl-1,3-propanediol or combinations thereof; the (a)(ii)(2) polyhydroxyl compound having 3 or more hydroxyl groups comprises 1,1,1-trimethylol propane, 1,1,1-trimethylolethane, glycerin, pentaerythritol, sorbitol, 1,2,6-hexanetriol, or combinations thereof; the (b)(i) polycarboxylic acid comprises isophthalic acid (or dimethyl isophthalate), terephthalic acid (or dimethyl terephthalate), 1,4-cyclohexanedicarboxylic acid, 1,3-cyclohexanedicarboxylic acid, or adipic acid or combinations thereof; and the (b)(ii) polycarboxylic anhydride comprises trimellitic anhydride, hexahydrophthalic anhydride, pyromellitic anhydride, maleic anhydride, succinic anhydride, or combinations thereof.

25. The composition of claim 24, wherein the curable polyester resin comprises both an (a)(ii)(1) diol and an (a)(ii)(2) polyhydroxyl compound having 3 or more hydroxyl groups.

26. The composition of claim 22, wherein the (a)(ii)(2) polyhydroxyl compound having 3 or more hydroxyl groups comprises 1,1,1-trimethylol propane, 1,1,1-trimethylolethane, glycerin, or combinations thereof; the (b)(i) polycarboxylic acid comprises isophthalic acid, 1,4-cyclohexanedicarboxylic acid, or combinations thereof; and the (b)(ii) polycarboxylic anhydride (b)(ii) comprises trimellitic anhydride, hexahydrophthalic anhydride, pyromellitic anhydride, maleic anhydride, succinic anhydride, or combinations thereof.

27. A method for the preparation of a curable polyester resin composition comprising:
   a) a first stage for making a polyester intermediate composition by combining polyhydroxyl compounds and polycarboxylic acid compounds to form a reaction mixture, and reacting the reaction mixture in a reactor at a temperature from 180-250° C., optionally in the presence of an acid catalyst, until the reaction mixture has an acid number of 0 to 20 mg KOH/g, and b) thereafter, a second stage for forming a curable polyester composition by reacting a polycarboxylic anhydride with the reaction mixture at a temperature of 140° C. to 180° C. to thereby obtain a polyester composition having an acid number of greater than 20 mg KOH/g.

28. The method of claim 27, wherein the reaction mixture is cooled to 180° C. or less prior to contact with a polycarboxylic anhydride.

29. The method of claim 27, wherein a distillate is removed from the reactor during step (a).

30. The method of claim 27, wherein the reaction in stage a) proceeds at a temperature of at least 200° C. for at least 80% of the residence time of the reaction measured as commencing on when the temperature within the reactor reaches 160° C. or more and ending when the acid number of the reaction mixture reaches or falls to 20 mg KOH/g.

31. The method of claim 30, wherein the reaction in stage a) proceeds under a vacuum for a portion of the residence time.

32. The method of claim 31, wherein the vacuum is within a range of 600 torr to 0.5 torr.

33. The method of claim 27, wherein the polycarboxylic anhydride is reacted at a temperature within a range of 150° C. to 180° C.

34. A solvent containing coating composition, comprising:
a) the curable polyester resin composition of claim 1,
b) a crosslinker compound comprising an amino resin, phenolic resin, isocyanate resin, or an epoxy resin, and
c) an organic solvent.

35. The composition of claim 34, wherein the amount of organic solvent is at least 40 wt. %, based on the weight of the solvent containing coating composition.

36. The composition of claim 34, which comprises 3 wt. % or less of water.

37. The composition of claim 34, which comprises less than 3 wt. % of the curable polyester resin as solid particles, based on the total weight of the curable polyester (a).

38. The composition of claim 37, which comprises less than 1 wt. % of the curable polyester resin as solid particles, based on the total weight of the curable polyester (a).

39. The composition of claim 34, wherein the crosslinker compound comprises a resole type phenolic resin.

40. The composition of claim 34, wherein the crosslinker compound comprises a resole phenolic resin containing at least 50 wt. % of the residues of unsubstituted phenol and/or meta-substituted phenol, based on the total phenolic residues of the crosslinker resin.

41. The composition of claim 34, wherein the crosslinker compound comprises a resole phenolic resin and an amino resin.

42. An aqueous dispersion comprising:
a) the curable polyester resin composition of claim 1,
b) a neutralizing agent, and
c) water.

43. The dispersion of claim 42, wherein the amount of water is at least 55 wt % based on the weight of the aqueous dispersion.

44. The dispersion of claim 42, wherein the neutralizing agent comprises an amine.

45. The dispersion of claim 42, further comprising an alcohol as a co-solvent in an amount of 15 wt. % or less based on the weight of the dispersion.

46. The dispersion of claim 42, wherein the dispersion comprises 20 wt. % to 60 wt. % of the curable polyester resin.

47. The dispersion of claim 42, wherein the dispersion comprises 25 wt % to 45 wt. % of the curable polyester resin.

48. A curable waterborne coating composition, comprising
a) the curable polyester resin composition of claim 1 having an acid number within a range of 50 to 120 mg KOH/g,
b) a neutralizing agent,
c) water, and
d) a crosslinker compound comprising an amino resin, phenolic resin, isocyanate resin, or an epoxy resin.

49. The composition of claim 48, wherein the crosslinker compound comprises a resole phenolic resin.

50. The composition of claim 48, wherein the crosslinker compound contains at least 50 wt. % of the residues of unsubstituted phenol and/or meta-substituted phenol, based on the total phenolic residues of the crosslinker resin.

51. The composition of claim 48, wherein the crosslinker compound comprises a resole phenolic resin and an amino resin.

52. A powder coating composition comprising:
a) the curable polyester resin composition of claim 1 which has a glass transition temperature of greater than 50° C., and
b) a crosslinker compound comprising an amino resin, blocked isocyanate resin, phenolic resins, epoxy resin, or an epoxidized phenolic resin.

* * * * *